US010861063B2

(12) United States Patent
Tietzen

(10) Patent No.: US 10,861,063 B2
(45) Date of Patent: Dec. 8, 2020

(54) METHOD, SYSTEM, AND COMPUTER PROGRAM FOR AUTOMATED CAUSE MARKETING USING MOBILE DEVICES

(71) Applicant: EDATANETWORKS INC., Calgary (CA)

(72) Inventor: Terrance Patrick Tietzen, Edmonton (CA)

(73) Assignee: EDATANETWORKS INC., Calgary (CA)

( * ) Notice: Subject to any disclaimer, the term of this patent is extended or adjusted under 35 U.S.C. 154(b) by 0 days.

(21) Appl. No.: 14/672,756

(22) Filed: Mar. 30, 2015

(65) Prior Publication Data

US 2015/0206203 A1 Jul. 23, 2015

Related U.S. Application Data

(63) Continuation-in-part of application No. 14/283,632, filed on May 21, 2014, which is a continuation of (Continued)

(51) Int. Cl.
*G06Q 30/00* (2012.01)
*G06Q 30/02* (2012.01)
(Continued)

(52) U.S. Cl.
CPC ......... *G06Q 30/0279* (2013.01); *G06Q 30/02* (2013.01); *G06Q 30/0211* (2013.01);
(Continued)

(58) Field of Classification Search
CPC .................. G06C 30/0279; G06Q 30/0279
See application file for complete search history.

(56) References Cited

U.S. PATENT DOCUMENTS 6,101,483 A 8/2000 Petrovich et al.
6,285,986 B1 9/2001 Andrews
(Continued)

FOREIGN PATENT DOCUMENTS

CA 2780059 A1 5/2001
CA 2518481 9/2004
(Continued)

OTHER PUBLICATIONS

Australian Government IP Australia, Patent Examination Report No. 2 dated May 22, 2015, issued on Australian Patent Application No. 2009354947.
(Continued)

*Primary Examiner* — Scott C Anderson
(74) *Attorney, Agent, or Firm* — Bradley K. DeSandro; Desandro Law Group PLLC

(57) ABSTRACT

The present invention teaches a system, method and computer program for enabling local or regional merchants to participate in an automated cause marketing (ACM) program using mobile devices. The ACM program that may provide benefits to several parties involved in fundraising for one or more supported organizations, including one or more supported organizations, advertising providers, merchants, and individuals. Merchants are able to access enhanced analytics regarding their transactions with members and non-members of the ACM program and can use these enhanced analytics to realize an increased number of or revenue from transactions with members. The present invention also teaches a system and method for enabling advertising providers to acquire and analyze data associated with consumers-merchant transactions. The present invention provides the above features optimally using mobile devices. Furthermore, the present invention, may enable a member to disseminate its charitable preferences and con-
(Continued)

tribution notifications to members of its electronic social networks.

20 Claims, 16 Drawing Sheets

Related U.S. Application Data application No. 13/508,084, filed as application No. PCT/CA2009/001605 on Nov. 6, 2009, now Pat. No. 8,756,102.

(51) Int. Cl.
*H04W 4/029* (2018.01)
*G06Q 50/00* (2012.01)

(52) U.S. Cl.
CPC ..... *G06Q 30/0222* (2013.01); *G06Q 30/0224* (2013.01); *G06Q 30/0226* (2013.01); *G06Q 30/0229* (2013.01); *G06Q 30/0231* (2013.01); *G06Q 30/0233* (2013.01); *G06Q 30/0241* (2013.01); *G06Q 30/0242* (2013.01); *G06Q 30/0256* (2013.01); *G06Q 50/01* (2013.01); *H04W 4/029* (2018.02); *G06Q 30/0214* (2013.01)

(56) References Cited

U.S. PATENT DOCUMENTS

| | | | |
|---|---|---|---|
| 7,107,268 | B1 | 9/2006 | Zawadzki et al. |
| 7,424,617 | B2 | 9/2008 | Boyd et al. |
| 2002/0087573 | A1 | 7/2002 | Reuning et al. |
| 2002/0091703 | A1 | 7/2002 | Bayles |
| 2002/0174021 | A1* | 11/2002 | Chu et al. ............... 705/26 |
| 2004/0015562 | A1* | 1/2004 | Harper et al. ........... 709/217 |
| 2005/0043992 | A1* | 2/2005 | Cohagan ............ G06Q 30/02 705/14.11 |
| 2005/0228719 | A1 | 10/2005 | Roberts |
| 2006/0253320 | A1 | 11/2006 | Heywood |
| 2007/0022008 | A1* | 1/2007 | Kingsborough et al. ...... 705/14 |
| 2007/0083449 | A1* | 4/2007 | Roberts ............... G06Q 20/10 705/35 |
| 2007/0096984 | A1* | 5/2007 | Leitch ............... G01C 21/206 342/453 |
| 2007/0112627 | A1 | 5/2007 | Jacobs et al. |
| 2007/0192321 | A1* | 8/2007 | Farr ................. G06F 17/30902 |
| 2007/0219871 | A1 | 9/2007 | Rolf et al. |
| 2007/0221736 | A1* | 9/2007 | Bailey ............... G09F 3/0292 235/487 |
| 2007/0288312 | A1 | 12/2007 | Wang |
| 2008/0114611 | A1* | 5/2008 | Nichols .............. G06Q 30/02 235/492 |
| 2008/0162279 | A1 | 7/2008 | Hershkovitz et al. |
| 2008/0228632 | A1 | 9/2008 | Gotthelf et al. |
| 2008/0233957 | A1 | 9/2008 | Akama |
| 2008/0248815 | A1 | 10/2008 | Busch |
| 2009/0281871 | A1 | 11/2009 | Tietzen et al. |
| 2009/0287592 | A1 | 11/2009 | Brooks et al. |
| 2010/0145784 | A1 | 6/2010 | Sriver et al. |
| 2012/0221400 | A1 | 8/2012 | Tietzen |
| 2012/0278140 | A1* | 11/2012 | Mercuri .............. G06Q 30/00 705/14.1 |

FOREIGN PATENT DOCUMENTS

| | | |
|---|---|---|
| CA | 2518481 A1 | 9/2004 |
| CA | 2546151 A1 | 11/2007 |
| WO | 2011054071 | 5/2011 |

OTHER PUBLICATIONS

United States Patent and Trademark Office, Office Action dated Jul. 3, 2014, issued in U.S. Appl. No. 14/283,632.
United States Patent and Trademark Office, Office Action dated May 20, 2015, issued in U.S. Appl. No. 14/283,632.
United States Patent and Trademark Office, Office Action dated Feb. 26, 2013, issued in U.S. Appl. No. 13/168,488.
United States Patent and Trademark Office, Office Action dated Oct. 11, 2013, issued in U.S. Appl. No. 13/168,488.
United States Patent and Trademark Office, Office Action dated May 7, 2014, issued in U.S. Appl. No. 13/168,488.
United States Patent and Trademark Office, Office Action dated Nov. 4, 2014, issued in U.S. Appl. No. 13/168,488.
Australian Government IP Australia, Patent Examination Report No. 1 dated Nov. 24, 2014, issued on Australian Patent Application No. 2009354947.
Patermaster, "CFC Memorandum 2006-19", Combined Federal Campaign Reference Materials, Jul. 11, 2006, on-line at opm.gov.
United States Patent and Trademark Office, Office Action Summary dated Apr. 8, 2013, issued on U.S. Appl. No. 13/508,084.
Norton Rose Fulbright Canada LLP, Office Action Response dated Aug. 1, 2013, filed on U.S. Appl. No. 13/508,084.
United States Patent and Trademark Office, Office Action Summary dated Sep. 30, 2013, issued on U.S. Appl. No. 13/508,084.
Australian Government IP Australia, Examiner's First Report dated Apr. 19, 2012, issued on Australian Patent Application No. 2008258248.
Wrays, Response to Examiner's First Report dated Oct. 21, 2013, filed on Australian Patent Application No. 2008258248.
Australian Government IP Australia, Patent Examination Report No. 2 dated Nov. 13, 2013, issued on Australian Patent Application No. 2008258248.
International Search Report of the Authorized Searching Authority (Corresponding Application: PCT/CA2009/001605); Canadian Intellectual Property Office, Authorized Officer Riaz Zarrar, dated Jul. 8, 2010; (3 pages).
Guardia, Cause Marketing Partnerships . . . The Fifth "P"; Aug. 27, 2009; retrieved from the Internet at URL http://www.slideshare.net/KooDooZ/ad-2-san-diego-cause-marketing-night-1939688; pp. 14-16.
United States Patent and Trademark Office, Office Action dated Jun. 9, 2016, issued in U.S. Appl. No. 14/686,247.
United States Patent and Trademark Office, Office Action issued in U.S. Appl. No. 14/283,632 dated Aug. 3 2016.
United States Patent and Trademark Office, Office Action dated Nov. 13, 2015, issued in U.S. Appl. No. 14/283,632.
United States Patent and Trademark Office, Office Action dated Aug. 27, 2015, issued in U.S. Appl. No. 14/686,247.

* cited by examiner

101 Report Dates

| Period | Type | Start | End |
|---|---|---|---|
| Selected Period | 1 Month | 2009-05-01 | 2009-05-31 |
| Prior Period | 1 Month | 2009-04-01 | 2009-04-30 |
| Program Lifetime | | 2009-04-01 | 2009-05-22 |

Change Selected Period

103 Reward Redemption

Manage Rewards

Transactions

105

| Average Credit Card Transaction History | Selected | Prior | Lifetime |
|---|---|---|---|
| Non-Member* | n/a | n/a | n/a |
| Member | $55.00 | $0.00 | $55.00 |
| Incremental | n/a | n/a | n/a |

*Non-Member retail customer transactions based on actual transaction data.

| Transaction Information | Selected | Prior | Lifetime |
|---|---|---|---|
| Transactions | 1 | 0 | 1 |
| Members that Transacted | 1 | 0 | 1 |
| Members that also Transacted at other courses | 100.0% | n/a | 100.0% |
| Transaction Volume – Male | $55.00 | $0.00 | $55.00 |
| Transaction Volume – Female | $0.00 | $0.00 | $0.00 |
| Transaction Volume – Total | $55.00 | $0.00 | $55.00 |

Additional Analytics

Rewards

107 Reward Activity

| Type | Awarded (Selected) | Awarded (Prior) | Awarded (Lifetime) | Activated (Selected) | Activated (Prior) | Activated (Lifetime) |
|---|---|---|---|---|---|---|
| Member | - | - | - | 8 | 7 | 15 |
| Daily Special | - | - | - | 0 | 0 | 0 |
| Acquisition | 10 | 11 | 21 | 5 | 2 | 7 |
| Appreciation (Frequency) | 0 | 0 | 0 | 0 | 0 | 0 |
| Appreciation (Spending) | 0 | 0 | 0 | 0 | 0 | 0 |
| Feedback | 0 | 0 | 0 | 0 | 0 | 0 |

Reward Availability

| Type | Awarded (Selected) | Awarded (Prior) | Awarded (Lifetime) |
|---|---|---|---|
| Member | 5 | 5 | 5 |
| Daily Special | 0 | 0 | 0 |
| Acquisition | 2 | 2 | 2 |
| Appreciation (Frequency) | 0 | 0 | 0 |
| Appreciation (Spending) | 0 | 0 | 0 |
| Feedback | 3 | 3 | 3 |

Manage Rewards

109 Member Feedback

| Lifetime Survey Completion Rate | Surveys Completed (Selected) | Surveys Completed (Prior) | Surveys Completed (Lifetime) |
|---|---|---|---|
| 100.00% | 1 | 0 | 1 |

Survey Response Analysis

| Response | Responses (Selected) | Responses (Prior) | Responses (Lifetime) | Transaction Volume (Selected) | Transaction Volume (Prior) | Transaction Volume (Lifetime) |
|---|---|---|---|---|---|---|
| Introduced by Program | 0.0% | 0.0% | 0.0% | $0.00 | $0.00 | $0.00 |
| Community-Minded | 0.0% | 0.0% | 0.0% | $0.00 | $0.00 | $0.00 |
| Regular Customer | 0.0% | 0.0% | 0.0% | $0.00 | $0.00 | $0.00 |
| Shops with Competitor | 0.0% | 0.0% | 0.0% | $0.00 | $0.00 | $0.00 |

Member Experience Analysis

| Response | Selected | Prior | Lifetime |
|---|---|---|---|
| Positive Experience | 0.0% | 0.0% | 0.0% |
| Negative Experience | 0.0% | 0.0% | 0.0% |

Additional Analytics

111 Promotion Code

| | Selected | Prior | Lifetime |
|---|---|---|---|
| Codes Entered | 0 | 0 | 0 |
| Most Used Code | n/a | n/a | n/a |

113 Web Site Usage

| | Selected | Prior | Lifetime |
|---|---|---|---|
| Click throughs to your website | 3 | 1 | 4 |

115 Community Rate

| Current Donation Rate | Donations (Selected) | Donations (Prior) | Donations (Lifetime) |
|---|---|---|---|
| 1.00% | $0.55 | $0.00 | $0.55 |

Manage Donations

FIG. 10

May, 2009

| | < Previous Month | | Today | | | Next Month > |
|---|---|---|---|---|---|---|
| Sun | Mon | Tue | Wed | Thu | Fri | Sat |
| | | | | | 1<br>10 Rewards | 2<br>10 Rewards |
| 3<br>10 Rewards | 4<br>10 Rewards | 5<br>10 Rewards | 6<br>10 Rewards | 7<br>10 Rewards | 8<br>10 Rewards | 9<br>10 Rewards |
| 10<br>10 Rewards | 11<br>10 Rewards | 12<br>10 Rewards | 13<br>10 Rewards | 14<br>10 Rewards | 15<br>10 Rewards<br>1 Redeemed<br>1% Donation | 16<br>10 Rewards |
| 17<br>10 Rewards | 18<br>10 Rewards | 19<br>10 Rewards | 20<br>10 Rewards | 21<br>10 Rewards | 22<br>10 Rewards | 23<br>10 Rewards |
| 24<br>10 Rewards | 25<br>10 Rewards | 26<br>10 Rewards | 27<br>10 Rewards | 28<br>10 Rewards | 29<br>10 Rewards | 30<br>10 Rewards |
| 31<br>10 Rewards | | | | | | |

METHOD, SYSTEM, AND COMPUTER PROGRAM FOR AUTOMATED CAUSE MARKETING USING MOBILE DEVICES

CROSS-REFERENCE TO RELATED APPLICATIONS

This application is a continuation-in-part of U.S. patent application Ser. No. 14/283,632 which is a continuation of U.S. patent application Ser. No. 13/508,084, which is the National Stage Entry of International Application No. PCT/CA2009/001605, filed Nov. 6, 2009, the entireties of all are hereby incorporated by reference.

FIELD OF THE INVENTION

The present invention relates to automated cause marketing. The present invention more specifically relates to a system, method and computer program for attracting local or regional businesses to an automated cause marketing environment by providing enhanced analytics relating to these business' transactions and enabling businesses to leverage these analytics to increase the number of or revenue from transactions.

BACKGROUND

Popular fundraising methods have changed significantly in recent years. For example, supported organizations traditionally raised money from taxes, public donations, corporate donations, and fundraising drives. More recently, supported organizations have utilized lotteries to attract funds. However, online systems are now emerging to enable substantial flow-through of donation to supported organizations in connection with loyalty systems. These loyalty systems enable retail businesses to realize increased revenues and repeat business from consumers.

In another example, public and private interest groups often raised money by requesting donations and other means of financial support from people and companies whose views aligned with the group.

Some of the more advanced loyalty systems may be termed automated cause marketing ("ACM"). An ACM program typically automates dissemination of benefits to several parties involved in fundraising, including one or more supported organizations (for example, charities), merchants, and individuals (also referred to as members, consumers, or customers). Optimally, flow-through to the supported organizations is maximized in the ACM model. One exemplary model of an ACM program is disclosed in U.S. patent application Ser. No. 12/118,923 to EDATANET-WORKS™ for "Method, System, and Computer Program for Providing a Loyalty Engine for Automated Cause Management".

The ACM program, in its various typical implementations, may be administered by one or more of the supported organizations or an ACM administrator, who could also be the same entity as one or more of the merchants, a credit card company, another loyalty offeror, an online store, an offline store offering a credit facility, etc.

Typically, consumers are attracted to and join an ACM program based on the particular supported organizations involved. It is common for a particular consumer to favor an ACM program that benefits supported organizations with which the consumer has an emotional bond. The consumer will then often prefer to transact with merchants registered with the ACM program rather than those not registered with the ACM program so as to benefit these supported organizations.

However, what has not been contemplated is a system that considers the emotional bond a consumer might have with particular merchants. It is well known that many consumers favor particular merchants, such as local or regional businesses that are "institutions" in their communities. These local and regional businesses are often referred to as "mom and pop stores", illustrating the familial connection felt by their customers.

These local and regional businesses may not have any internet presence or other electronic connection with the outside world. They have not had any opportunity to be integrated into loyalty systems such as ACM programs. Ironically, it is this same type of business that will tend to most favor donations to supported organizations with which they also have an emotional bond, so their consumers have not necessarily been fully incentivized to join ACM programs. These consumers clearly will often be more likely to participate in an ACM program if the local or regional business is tied to the program.

However, it is very challenging to incorporate these types of merchants and supported organizations into current ACM programs. Most ACM programs must operate on a large scale, such as nationally, to be able to generate the amounts of exposure and revenues to effectively benefit the parties involved, and to make ACM programs and related activities provide sufficient return to supported organization, given the often significant costs associated with providing the infrastructure required by such programs. In other words, it may not be cost effective to integrate regional or local merchants and supported organizations in typical ACM programs. Where they are involved, it is often at a cost, or burden, to the ACM program. This is why ACM programs generally focus on a relatively small number of supported organizations and businesses aligned with these supported organizations that operate on a national or at least regional basis. Prior art ACM programs accordingly generally fail to leverage the bulk of activity directed towards these supported organizations and a significant proportion of businesses that would support them, that operate at a local or regional level.

Another issue relating to current ACM programs is the lack of exposure they have to those consumers that are not actively seeking out ways in which to donate to supported organizations. Many consumers are not currently aware of the existence of many ACM programs, or even the concept of the ACM program in general. There has to date not been any technique for addressing this deficiency of ACM programs, and typical advertising methods are likely impractical given that supported organizations, particularly charities, often do not have sufficient funds for such marketing efforts. There has, in this regard, not been any technique developed for enhancing customer acquisition on a large scale.

Therefore, what is required is an ACM program that is able to allow local and regional businesses and supported organizations to be involved so as to leverage their inclusion in the ACM program to enhance customer acquisition. What is further required is a system that leverages existing relationships to allow consumers to become aware of ACM programs and the benefits they provide to supported organizations, including supported organizations.

SUMMARY OF THE INVENTION

The present invention provides a computer network implementable method for providing a loyalty program for promoting contributions to one or more supported organizations, the method characterized by: (a) linking one or more users to a loyalty program established by an administrator and establishing the users as members of the loyalty program; (b) linking one or more local or regional merchants to the loyalty program; (c) associating a plurality of transactions between the one or more members and the one or more local or regional merchants to the loyalty program and enabling the recording of information for each of the plurality of transactions; (d) defining rules for making contributions to the one or more supported organizations based on the transactions and directing contributions to the one or more supported organizations based on the rules; and (e) enabling, or facilitating the enabling, by one or more computer processors, each of the one or more local or regional merchants to access analytic information relating to the plurality of transactions and to increase the number of or revenue from future transactions based on the analytic information.

The present invention also provides a system for providing a loyalty program for promoting contributions to supported organizations, the system characterized by: (a) a web server; (b) a loyalty engine linked to the web server, the loyalty engine established by an administrator; (c) one or more point of sale facilities for accepting payment, each linked to one or more merchants that are linked to the loyalty program; (d) a means for associating a plurality of transactions occurring at the one or more point of sale facilities with the loyalty engine; (e) a database enabling the recording of information for each of the plurality of transactions, the loyalty engine defining rules for making contributions to the one or more supported organizations based on the transactions and directing contributions to the one or more supported organizations based on the rules; and (f) an interface for enabling each of the one or more merchants to access analytic information relating to the plurality of transactions.

The present invention further provides a computer program comprising computer instructions which when loaded on a server computer connected to the Internet are operable to provide a web application defining a loyalty engine for promoting contributions to supported organizations, characterized in that the loyalty engine is operable to define a loyalty program by performing the steps of: (a) linking one or more users to a loyalty program established by an administrator and establishing the users as members of the loyalty program; (b) linking one or more local or regional merchants to the loyalty program; (c) associating a plurality of transactions between the one or more members and the one or more local or regional merchants to the loyalty program and enabling the recording of information for each of the plurality of transactions; (d) defining rules for making contributions to the one or more supported organizations based on the transactions and directing contributions to the one or more supported organizations based on the rules; and (e) enabling each of the one or more local or regional merchants to access analytic information relating to the plurality of transactions and to increase the number of or revenue from future transactions based on the analytic information.

In another aspect, there is provided a system for providing a loyalty program, the system comprising: a loyalty engine comprising a data storage device and a processor for configuring a loyalty program, wherein the loyalty program generates one or more member profiles and one or more merchant profiles, wherein each of the one or more member profiles defines demographic data, financial card data, supported organization data, a member identification, and mobile device information, wherein each merchant profile defines a merchant identification and a location, wherein the loyalty engine creates rewards for members of the loyalty program using the demographic data, the supported organization data, and the locations associated with the merchants; a mobile device utility providing an interface between the loyalty engine and one or more mobile devices to enable optimal transacting between the loyalty engine and the one or more mobile devices, wherein the mobile device utility is configured to: interface with location tracking hardware of a mobile device of the one or more mobile devices to determine that the mobile device location is within a predefined distance of a location identified in a merchant profile of the one or more merchant profiles, wherein the mobile device is identified by mobile device information defined in a member profile of the one or more member profiles, wherein a member is identified by member identification in the member profile; transmit a reward of the rewards of the loyalty program to the mobile device at approximately a time when the mobile device is within the predefined distance of the location identified in a merchant profile, wherein the reward relates to a merchant identified by merchant identification in the merchant profile identifying the location, wherein the reward comprises a machine readable code, wherein the reward triggers contributions to the one or more supported organizations based on a transaction between the member and the merchant; wherein the loyalty engine: receives transaction data for a transaction between the member and the merchant, the transaction processing at a point of sale facility at the location, the transaction data indicating the merchant identification, a transaction amount, a date, a time, an indication that payment for the transaction involved the mobile device, and an indication of the reward; determines, using the transaction data, that the transaction involved redemption of the reward initiated via the machine readable code; and generates signals for directing a contribution amount for a contribution to the one or more supported organizations based on the reward redemption.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

FIG. 10 illustrates an example web page for providing a merchant with analytic information in accordance with the present invention.

FIG. 11 displays a calendar interface for configuring contributions and managing rewards.

DETAILED DESCRIPTION

Overview

Figure 1:
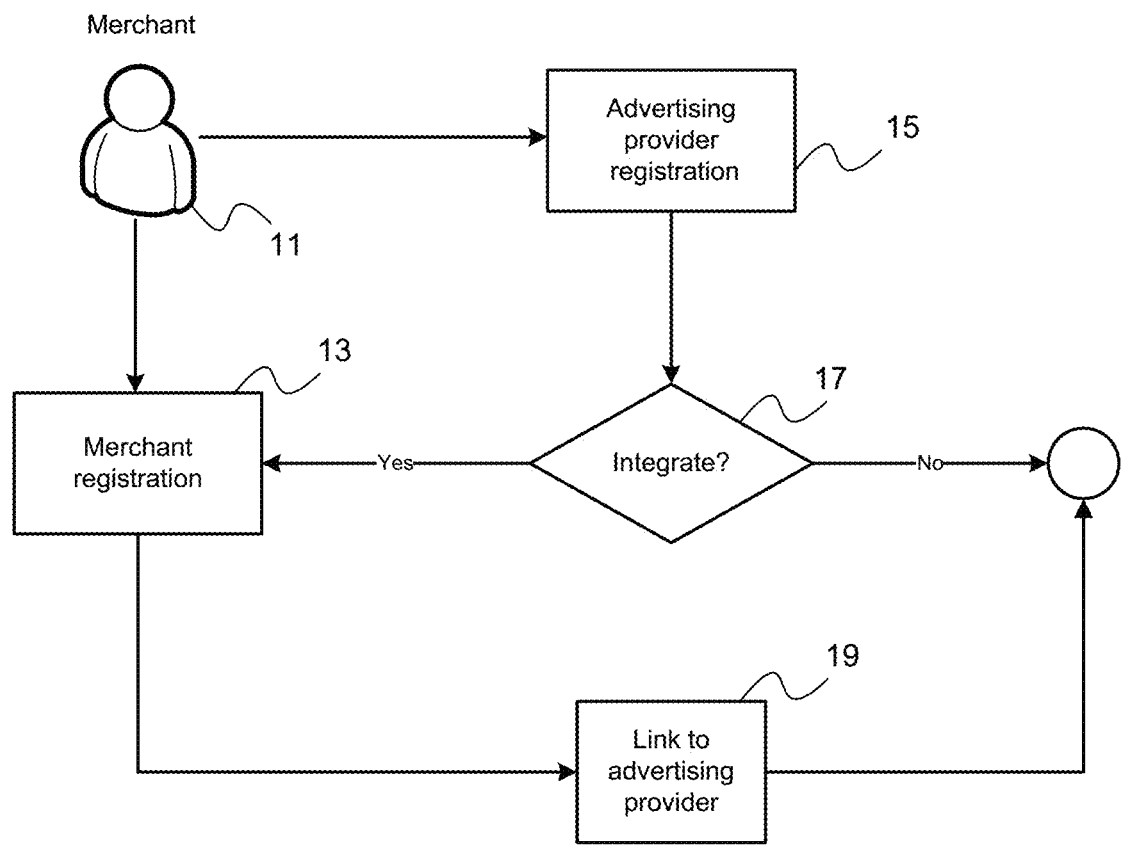
FIG. 1 illustrates a merchant registering with the ACM program using a boarding process of the advertising provider.

The present invention provides a system, method and computer program for attracting businesses to an automated cause marketing (ACM) environment (referred to herein as an ACM program) that is provided by a loyalty engine. These businesses are attracted to the ACM program through the availability by the ACM program of enhanced analytics that would otherwise not be available to these businesses without significant cost.

The enhanced analytics provided to the business includes information to increase customer acquisition and retention and maximize revenue. This is accomplished by reporting to the business information relating to its customer's preferences, their responses to previous promotions (which is indicative of their likelihood of future transactions using those or similar promotions), and means for attracting new and existing customers to transact with the business. The interface of the present invention enables the business to leverage the analytics to provide to customers these means for attracting them. Consequently, a business can experience an increased number of or revenue from transactions using the ACM program, which in turn benefits the other parties to the ACM program.

The ACM program of the present invention is particular advantageous for inclusion of local or regional businesses. These businesses typically do not have any online presence (they may be strictly "brick and mortar stores"), however the present invention enables them to still benefit from real-time analytic information relating to their customers and transactions. It should be understood that the term "local and regional businesses" is not to be construed as limiting in any sense. For example, a national business would benefit from the analytics herein presented however what is commonly known as a "local" or "regional" business or an independent business or franchisee would particularly benefit in a way that it could not in prior art ACM programs.

In return for attracting local and regional businesses, the ACM program increases in scope and a supported organization of the ACM program is able to realize further revenue streams owing to the inclusion of the local and regional businesses.

Businesses in the ACM program are referred to as "merchants" while customers are referred to as "members". Optimally, the system of the present invention includes a web server and a point of sale facility for each merchant in communication with the web server. The ACM program is a web-based program providing a loyalty engine, linked to the web server, providing an ACM program interface to enable features including rewards notification and dissemination, consumer surveying, events, offers and analytics. Transactions made between members and merchants using the point of sale facilities and form of payment can be recorded or otherwise linked to a database for further referral by members, merchants, the administrator or an intermediary. Members may complete surveys linked to merchants and corresponding transactions. Reviews based on the surveys can be generated for merchants and when other members are searching for a merchant these members can be presented with the completed reviews.

The present invention also provides a system and method for increasing customer acquisition in an ACM program. These customers may be added to the ACM program individually using novel technologies and techniques as described more fully below, or these customers may be added to the ACM program in sets or batches by leveraging user bases of other systems.

The batch customer acquisition process of the present invention includes a boarding process for adding customers to the ACM program. The boarding process may be provided by the ACM program and can be used by an intermediary to associate the intermediary with the ACM program, or may be provided by the intermediary and can be used by an ACM administrator to associate the ACM program with the intermediary. The intermediary typically has a user base and the boarding process automatically associates this user base with the ACM program as new consumers, or "members" of the ACM program. Similarly, the existing members of the ACM program can be linked as new users of the intermediary's system.

The individual customer acquisition model of the present invention includes a system and method for enabling an intermediary, for example an advertising provider, to be associated with a particular ACM program wherein the advertising provider may realize revenues as a result of connecting consumers with merchants, the merchants may be provided with enhanced analytics associated with consumers that choose to transact with them, and supported organizations, for example supported organizations or public or private interest groups, may realize further revenue streams in accordance with the rules of the ACM program.

The present invention enables an intermediary such as an advertising provider to also be advantageously associated with the ACM program while also increasing contribution opportunities to the supported organizations and loyalty opportunities to the merchant. The merchants and advertising provider may acquire and analyze data associated with consumer-merchant transactions. The present invention is equally beneficial for enabling an online advertising provider to benefit from offline transactions as it is from online transactions.

The present invention also provides the above advantages optimally using a mobile device or other wireless means. The mobile device may enable optimal dissemination of offers, rewards, contests, surveys, mapping, or other location or proximity based services. Mobile access to an ACM program interface may also be provided. The mobile device may be a computing device with at least one processor, at least one memory, and a network interface for wireless communication. The network interface may support different types of wireless network connections such as satellite, cellular, radio frequency, infrared, wi-fi, Bluetooth, NFC, and other wireless networking technologies. The network interface may also support wired communication. The mobile device may also have a display screen to display interfaces such as a graphical user interface (GUI). An example mobile device is a wearable device such as an article of clothing or an accessory that incorporates computer hardware.

Furthermore, the present invention enables a member to disseminate its support preferences, for example a list of supported organizations, to members of its electronic social networks. The ACM program may be enabled to disseminate associated information such as rewards, offers, events, and surveys in accordance with the rules of the ACM program.

Customer Acquisition

In one particular implementation, the ACM program is hosted by an ACM administrator, which may be a supported organization or a third party. It should be understood that reference in this specification to a supported organization could equally apply to a plurality of supported organizations.

Individuals may register with the ACM program to become members. Registration could be provided by a plurality of registration means. The individual may already be associated with a pre-registered financial program, which could be any financial program in which one or more personal (identification) or demographic information is associated with the individual. A registration interface of the present ACM program, such as a web page, may be provided to the individual, in which the interface may include a means by which to import all personal or demographic information and preferences from the pre-registered financial program to the present ACM program. Furthermore, the one or more forms of payment linked to the pre-registered financial program could also be linked with the present ACM program to enable the ACM program to track transactions made with those forms of payment. Alternatively, the individual may register with the ACM program by providing, through an interface such as a web page, the individual's personal or demographic information, and the ACM program may generate a financial card number for that individual. A financial card may also be sent to the individual. Example financial cards include debit cards, credit cards, gift cards, or other card relating to a financial account. It should be understood that the "financial card" need not be a physical card, but could be any form of payment device, including for example an RFID chip, a mobile phone, electronic token, electronic certificate, etc. depending on, for example, supporting infrastructure of merchants. For example, a financial card may be an electronic representation of a financial instrument non-transitorily stored on memory of a mobile device so that the mobile device may be used by a member for payment for transactions with merchants. The mobile device may receive data related to the financial card and transmit data related to the financial card to implement operations for transaction processing. For example, a merchant may have an electronic point of sale facility that electronically interacts with mobile device with financial card data stored thereon to process the payment.

A mobile device may have multiple different financial cards stored thereon to provide a virtual or electronic "wallet". A mobile interface may provide card management features to enable a user to navigate available financial cards (represented as icons, graphical representations of cards, and so on), select a financial card for payment for a given transaction, and authorize the transaction. The mobile interface may also provide a mechanism to register, validate and verify financial cards. The mobile device may implement security techniques to secure data related to the financial card stored thereon to prevent unauthorized access and use thereof, including for example, encryption, biometrics, passwords, and so on. Accordingly, a hardware component of a mobile device may receive, store and transmit financial data so that the mobile device acts as a financial card. An example mobile device is a wearable device that may receive, store, and transmit the financial data and act as a financial card.

The ACM program may also be enabled to receive from the member a profile which may include a set of rich data including additional personal information, such as a list of the social networks the member is linked to, authentication information for those social networks (e.g. member names and passwords), preferred supported organizations and merchants (as described more fully below), or other information relevant to enabling optimal usage of the ACM program.

In accordance with this rich data, the present invention enables the ACM program to select rewards defined by merchants in accordance with the rules of the ACM program and to communicate these rewards to the members based on administrative criteria (such as demographic targeting of rewards). It should be noted that the architecture of the ACM program may enable shielding of the personal information of the member from individual merchants, as the ACM administrator may be in control of the personal information and may act as an intermediary between merchants and members for purposes of dissemination of rewards, contests, surveys, offers, or other communications. This measure is more fully described below.

A particular ACM program may be configured to benefit one or more supported organizations, for example one or more charities or public or private interest groups. An ACM program interface may be configured to enable a member to select one or more preferred supported organizations, allocate contributions or donations in percentages or contribution tiers (where the first X dollars benefit supported organization A, the next Y dollars benefit supported organization Y, etc.), or a combination thereof, to one or more supported organizations. Many other contribution priority schemes could be contemplated.

Furthermore, the ACM program interface may also be configured to enable a member to modify its contribution preferences at any time or only after particular periods of time. Another option the ACM program interface may enable is for a member to benefit a foundation or other disseminating entity that then disseminates contributions to one or more supported organizations. Further still, the ACM program interface could provide to the member one or more supported organization codes that, when entered by the member into the interface, could automatically configure particular dissemination rules.

One or more supported organizations may also disseminate supported organization codes. For example, a supported organization may send direct mail to its existing contributor base. The direct mail may contain a website address and a supported organization code. The contributor could navigate to the address, which may be a portal to the ACM program that enables the contributor to register as a member. Upon registration, the contributor could enter the code and automatically configure its preferences. The code may also be particular to the contributor, in which case it could signal to the ACM program that it can import that contributor's personal information from an electronic link to the supported organization's online data store.

Merchants may register with the ACM program through a plurality of means. The ACM program may provide an automated online boarding means or a manual boarding means. The online boarding means may enable a merchant to register with the ACM program in a similar way as the member may register. For example, a merchant having an existing registered merchant identification with another pre-registered financial program could be provided with a registration interface of the present ACM program, such as a web page, in which the interface includes a means by which to import all merchant transactional information and preferences from the pre-registered financial program to the ACM program. For example, the information may include the merchant identification (such as an identification number), credit card information, or automated clearing house billing information already linked to a database. Furthermore, the one or more forms of payment used with the pre-registered financial program could also be linked as tokens to the ACM program to track transactions made with those forms of payment. Alternatively, the merchant may register with the ACM program by providing through an interface the merchant's information including merchant identification, location, etc., and the ACM program may link a financial card or other billing system to the merchant.

It should be noted that particular ACM programs enable regional benefits and/or national benefits. The present invention provides the advantages described herein in a regional implementation wherein members participate in one region of the ACM program but can, when they are traveling for example, automatically participate in another region of the ACM program. Merchants that have a national or multi-regional presence may be associated with the ACM program, but in the regional implementation their individual outlets (i.e. stores) may be associated with the corresponding region of the ACM program.

The regional ACM programs may be optimally used to enable a regional (or local) supported organization to associate with the ACM program and receive benefits, even though they may not have a national presence and, therefore, likely lower national public recognition (which may otherwise have resulted in reduced benefits to the regional supported organization since ACM program members may not associate with an ACM program associated with an unfamiliar supported organization). A merchant in a regional ACM program may commit to donate a portion of its revenue from customers associated with the regional ACM program. The amount could be based on various parameters tracked by the ACM program, and the ACM program could enable a calculation of the amounts due by the merchant to the supported organization. Thus the present invention enables regional and local supported organizations to participate in ACM programs in a manner that is cost effective to all parties of the ACM program.

The present invention also enables a merchant to offer different contributions to designated supported organizations within the ACM program based on various factors tracked in the ACM program, including the transaction's time of day, transaction's day of week, member demographics, transaction history, and supported organization support.

A foundation may be the principal beneficiary of the ACM program, but the foundation may thereafter disseminate received funds to one or more supported organizations in accordance with rules set either internally or externally to the ACM program. The ACM program may provide a means by which merchants and members can allocate benefits to particular supported organizations or to the foundation to determine which supported organization to direct funds towards.

To enable batch customer acquisition a boarding means may be provided for enabling a third party intermediary to associate itself with the ACM program. The intermediary may be, for example, an online retailer having a customer base with user accounts, an online payment provider also having a customer base with user accounts, an online advertiser and/or search provider, or any other online presence having a customer base with user accounts. The intermediary could also be a company and the members to be acquired could be the employees of the company. The ACM program may make the boarding means accessible to the intermediary by, for example, a user interface for creating the association.

The intermediary may desire to associate with the ACM program for a plurality of purposes, including increasing its own customer base to include the ACM program's members, altruistic purposes, to increase its own charitable giving for tax purposes, or to appeal to consumers.

Once the intermediary associates with the ACM program, the user accounts of the intermediary may automatically become associated with the ACM program such that the users become members of the ACM program. The ACM program may then be operable to provide a user interface for these new members to complete their profiles, as described above, for the ACM program. It can be easily understood that this process increases the awareness of the ACM program and can instantly increase its customer base significantly.

ACM Program Provided Boarding

The present invention also provides a boarding process that is implemented by the ACM program. An intermediary may use this boarding process to associate itself with the ACM program. The boarding process may include a user interface by which the intermediary indicates its desire to associate with the ACM program and ascent to terms established by the ACM program administrator for making such an association. Some of these terms may relate to payments flowing to the ACM program as a result of members' use of the ACM program options using the intermediary's system, as described more fully below. Similarly, the boarding process could be implemented by the intermediary to enable ACM program administrators to associate ACM programs with the intermediary.

Once an intermediary has been associated with the ACM program, the intermediary's members may automatically become members of the ACM program and optionally the ACM program's members may automatically become members of the intermediary system.

The ACM program may include means to identify that new members have been added, and means for alerting these members that they have been added. This may include a messaging means already being used by the intermediary's system or email, for example. Alternately, the intermediary may already utilize a portal page for each of its customers, and the ACM program could alert the new member using an icon or other alert on the portal page.

A new member to the ACM program can follow steps directed by the ACM program administrator in such a message to complete the member's profile in the ACM program. The member can then utilize the ACM program.

A new member to the intermediary's own system may be presented an option of whether to automatically associate their user account to the ACM program.

Analytics

In accordance with the above, the ACM program administrator, supported organizations, intermediaries, and merchants may each be enabled to receive enhanced analytic information associated with transactions between members and merchants. The enhanced analytics provided to the merchant includes information to increase customer acquisition and retention. This is accomplished by reporting to the merchant information relating to its customer's preferences, their responses to previous promotions (which may be indicative of their likelihood of future transactions using those or similar promotions), and means for attracting new and existing customers to transact with the business.

The purpose of providing a merchant with this information is to enable the merchant to easily determine ways for achieving customer acquisition and retention and for maximizing revenue. For example, typically a merchant will choose to model its practices on past successes. The analytic information enables a merchant of the ACM program to do so, by reporting on the success of past practices and by suggesting to the merchant appropriate future practices and/or enabling the merchant to model future practices appropriately. The merchant, in other words, uses the analytic information to increase its future revenues. The interface of the present invention enables the merchant to leverage the analytics in this way to disseminate means to attract customers. Consequently, a merchant can experience an increased number of or revenue from transactions using the ACM program, which in turn benefits the other parties to the ACM program.

An analytics utility may provide information that may include data involving members' interaction with merchants of the ACM program or intermediary's interface. For example, the ACM program may enable merchants to disseminate surveys, contests and events and receive feedback for same from members. Any other features enabled by the particular ACM program could similarly be included. The feedback could be recorded by the ACM program for processing by an analytics utility.

Local and regional businesses in particular benefit from these enhanced analytics since these businesses would not typically be in a position to incur the expense of obtaining such information. Through leveraging a multi-merchant system as in the present ACM program, each of these merchants benefit from the economies of scale in implementing the analytics utility.

The analytics utility may aggregate and categorize data including contribution amounts (nationally, regionally, locally, by supported organization type, by supported organization name, etc.), contributions to supported organizations based on the location of contributing members and/or merchants, member feedback regarding merchants, member location, member profiles (including total number of members, new members registered in a given period, member tenure breakdowns, active member percentages, etc., and could also be broken down by age, gender, income, location or other demographic information), member rewards (including reward listings, usage, etc.), member support (including contact rates, contact reasons, escalations, etc.), member transactions (including transaction totals, transaction amounts, trends, etc., each categorized by any number of options including merchant name, merchant type, merchant location, merchant profile, subcategories thereof, etc.), promotional codes (including code listings, new codes, and code usage), rates of return (including comparison reports on acquisition costs, revenue streams, etc.), community contributions, online statistics (including page visits, member login, pages/visit, percent of new visits, referring links, etc.), or other data. The data may be presented alphanumerically, for example in tabular format, and/or graphically, for example by bar graph or pie chart.

In accordance with transactional data, which may be of particular interest to merchants, transactions may be broken down by demographic information, recency, frequency, time of day, day of week, survey results (including commentary feedback), amount spent, or any other information operable to be collected by the ACM program. The analytics could be used to create a profile for the merchant pertaining to its members, which may aid the merchant in establishing criteria for creating and disseminating rewards, offers, and contests which the merchant can choose to utilize.

For example, rate of return information may be broken down based on member types such as new members, community minded members, regular members, dissatisfied members, and infrequent members. Data can be analyzed to determine the revenue growth or repeat revenue, as the case may be, based upon each type. Furthermore, non-member spending may be included so as to determine the efficacy of the ACM program link. The cost of administering or linking to the ACM program, acquiring members, retaining members, etc. can also be factored in to calculations of return.

The ACM program may provide multi-regional merchants with multi-regional analytics (i.e. combined data sets) in addition to region-specific analytics. This can be very useful for a merchant to evaluate and compare its various regional outlets' performance.

Reporting might also be broken down by date periods.

This data may also be provided by the analytics utility to the intermediary and merchants tied to the ACM program. Even within the intermediary organization and/or merchant organization, different data can be provided to different persons. For example, a managing director may have access to all data while an employee in sales may not be able to access profile information, for example, with member privacy in mind. In another example, regional outlets of a merchant may only be given access to view data relating to the members of the particular region while its national counterpart may view data relating only to national perspectives of members.

Furthermore, the analytics utility may present data to these interested persons (being from a merchant, supported organization, or intermediary) in various views. For example, there may be a "dashboard" type view that presents summarized information to an interested person. The analytics utility may enable interested persons to set up their dashboard to display by default particular information. The dashboard display may include links to expanded information on any of the categories presented.

Each of the ACM administrator, the intermediary and merchants may then use the data for analytic purposes, for example to determine purchasing patterns or any other information that it desires to reveal and that has not previously been known to these parties.

The ACM program may match the rewards, offers, and contests to the calculated profile to suggest or enable the dissemination of merchants' rewards, offers, and contests to members. Once the rewards, offers, and contests are disseminated to members, the ACM program may measure and record member responses to the rewards, offers, and contests. Merchants may be granted access to this data as well. The responses may include whether the member downloaded, printed, or redeemed the reward, offer, or contest. The member responses may indicate the member interest in each of the rewards, offers, and contests. The ACM administrator or the merchant can configure pre-set conditions, thresholds or rules so that if there is low interest the ACM program may automatically eliminate unattractive offers and assure retention and leveraging of attractive offers.

The advertising provider may already have means by which to associate personal information of members with other demographic information. Thus the information provided through use of the present invention may be aggregated with the existing information to enable enhanced analytics. An example may be a search provider that also is an email provider, and that displays to its email members one or more contextual advertisements in accordance with words and phrases appearing in emails. The present invention may enable a more thorough understanding of the interests of the email member, which may also be the member. Thus, even more targeted advertising may be displayed to the email member. Furthermore, the enhanced analytics could be used to provide targeted offers or rewards to the member/member, which may also be based on, for example, a tracked internet browsing history associated with the member.

It should be understood that the analytics utility may be operable to provide analytic information in real time or near real time since data is collected electronically and disseminated preferably using an Internet enabled communication means, for example through a web interface.

In one particular example, a merchant can refer to analytic information of members, including those that repeatedly transact with the merchant and those that do not. A merchant may find that the reason for repeat business is, for example, a particular offer disseminated using the ACM program. A merchant may decide to increase the dissemination of this particular offer to increase visits by members in the future.

The analytic information may be displayed to a merchant on a single web page for ease of reference although it should be understood that the information presented may be divided over a plurality of web pages and configured in any viewing format, including by table or graph. The merchant may be provided with means for customizing the amount and type of analytic information presented on the web page and, optionally, may be provided with links to further webpages to access additional information.

FIG. 10 illustrates an example web page for providing a merchant with analytic information in accordance with the present invention. The merchant may be provided with a time selection utility to select a time period for aggregating analytic information. The time period 101 may be preset to the current month but the merchant could change the month or change the range to include more or less time. The rest of the analytics presented would reflect the information applicable to this set time period, as appropriate to the type of information.

Possible categories of analytic information presented to a merchant may, for example, include reward redemption 103, transactions 105, rewards 107, member feedback 109, promotion codes 111, ACM program interface usage 113, and contributions to supported organizations 115.

The reward redemption analytics could display all of the rewards or one or more of the top rewards offered by the merchant that are most used by the members to which they are disseminated. The number or percentage of such rewards redeemed and the amount spent by a member when redeeming a reward can also be displayed. A merchant may typically use this information to decide on future reward dissemination, typically favoring those rewards that result in a greater redemption rate or greater spend. The merchant could also access a reward management utility to manage its rewards.

The reward management utility may enable a merchant to configure its rewards. For example, the utility could display to the merchant a rank of all rewards, the highest being those that result in more members transacting with the merchant or that result in the most revenues for the merchant. The merchant could add new rewards or remove rewards based on these ranks, in order to increase traffic or revenues further. Alternatively, the ACM program could automatically make poorly performing rewards unavailable while promoting well performing rewards.

The transaction analytics could provide analytic information relating to member transactions with the merchant and with other merchants for comparison purposes. The number and spend from member purchases and the number of unique members transacting with the merchant could be displayed. Similar information may be displayed for all or some competing merchants. Additionally, non-member transactions could be imported from point-of-sale information that can be linked to the ACM program from the merchant's existing infrastructure or through a manual entry. In this way, the merchant can evaluate the efficacy of the ACM program.

The transaction analytics may be presented over multiple time periods, including for example the selected time period, the previous time period and the lifetime of the merchant's enrollment with the ACM program. The transaction analytics could also be broken down by any of the demographics of the members including gender, age, income, etc. This information could assist a merchant in determining the efficacy of its use of the ACM program and in ways in which to maximize revenues, for example by promoting rewards or contests geared towards members that fit the demographic profile of an intended customer.

Transaction analytics could be displayed numerically or graphically. A graphical representation, for example, could display information on a monthly basis over the previous 12 month period in a bar graph. This would be ideally suited to compare transactions per month or revenues per month. Similarly, the information could be broken down hourly to show the average time of the day that a merchant received the most revenues. Pie charts, for example, could also be used for displaying breakdowns of transactions by any or a combination of the demographic information.

The rewards analytics could similarly assist a merchant in maximizing its revenues by appealing to its intended customers. The rewards analytics could display to the merchant the number of rewards disseminated (or "awarded") and activated. This information could be presented over multiple time periods, including for example the selected time period, the previous time period and the lifetime of the merchant's enrollment with the ACM program.

Rewards could also be displayed by type, with rewards analytics displayed for each type. For example, reward types, which could vary depending on the needs of the ACM program administrator and merchants, may include daily special rewards, customer acquisition rewards, transaction frequency appreciation rewards, transaction recency appreciation rewards and feedback awards. In some cases an ACM program may be configured not to allow "awarding"

of particular rewards. These rewards may be available to any member regardless of meeting criteria. For example, a daily special reward may be made available to all members. In this case, the daily special reward may not be "awarded" and the displayed analytics may be configured to reflect this, for example by reporting "n/a", "/" or "-" instead of a number of rewards awarded.

In one example of a daily special reward, a merchant with a revolving inventory (for example, a car rental company) may have particular low sales on certain days. The merchant may choose to configure daily specials on those days as greater discounts than other days, when sales are typically higher.

The rewards analytics could also provide the merchant with information relating to the availability of rewards, where the ACM program has set limited numbers of rewards that a merchant can disseminate based on any number of metrics. These analytics could also be displayed for each type of reward and over multiple time periods.

Member feedback analytics could reflect the feedback received from surveys. A completion rate for a merchant's surveys could be displayed including over multiple time periods. Additionally, some or all of the responses given by members could be displayed. For example, a particular merchant may configure a survey to ask a member how the member was introduced to the merchant, with possible selections including "by the ACM program", "community minded" (i.e. has a bond with the supported organization), "regular customer" and "shops with competitor". The member feedback analytics could display the breakdown of answers given by members over multiple time periods. The members' survey responses could also be cross referenced to transactional analytics. For example, the member feedback analytics could indicate that 10% of members reported they shopped with a competitor, and that these 10% of members spend a total of $10,000 at the merchant. This information could also be reported over multiple time periods. The member feedback analytics could also provide answers based on satisfaction levels of the members, categorized for example by "positive experience", "average experience" and "negative experience".

Surveys could be configured to ask members any number of questions. For example, information relating to customer satisfaction, intent to return to the merchant, intended frequency of visits, etc. could all be collected and displayed in the member feedback analytics.

Promotion code analytics may provide a merchant with a report, optionally over multiple time periods, displaying the number of promotional codes entered by members and the most frequently used code by members. These promotional codes may be configured by the merchant to provide members with discounts, for example.

ACM program interface (which could be, for example, a web site administered by the ACM program administrator) usage could also be reported to the merchant. The number of times members accessed a merchant's website through the ACM program website could be displayed. Additionally, statistics relating to the merchant's use of the ACM program interface for configuring its involvement in the ACM program and using analytics could be displayed.

Additionally, merchants could manage their contributions from the analytics. Contribution analytics could display to the merchant the amount of contributions to supported organizations from the transactions they have processed with members. The merchant could select to manage donations, configuring the distribution of contributions to one or more supported organizations.

The configuration utilities and reward management utility may also be integrally presented in a calendar interface. FIG. 11 displays a calendar interface for configuring contributions and managing rewards. Each day 117 in the calendar may briefly display the number of rewards available for dissemination by the merchant and the current contribution amount. A merchant could click on a day to activate a reward dissemination to a member or multiple members. The merchant could click on a day to configure its contribution amount to one or more supported organizations.

The calendar interface may also be used to quickly access analytics relating to particular days. For example, a merchant could quickly see how particular rewards performed on past days, transactional analytics for that day, etc. Optimally, this information would be displayed if a merchant merely held a mouse or other input device over the day of the calendar. Alternatively, or in addition, a news feed could be integrated to the calendar or provided separately from the calendar. The news feed may display information relating to analytic information, rewards, offers, surveys, transactions, contests or other desirable information.

Cross Loyalty

The present invention also provides a means by which merchants of an ACM program can participate in cross loyalty. Two complementary and non-competing businesses may wish to disseminate offers to members transacting at one of the merchant locations. For example, a member shopping at a clothing merchant may be sent an offer for a restaurant merchant nearby while a member eating at the restaurant merchant may be sent an offer for the clothing merchant.

Cross-loyalty revenues may also be reported in the analytics.

Intermediary Enabled Sales

The present invention also provides a system and method for enabling an intermediary such as an advertising provider to be associated with a particular ACM program wherein the advertising provider may realize revenues as a result of connecting members with merchants, the merchants may be provided with enhanced analytics associated with members that choose to transact with them, and supported organizations may realize further revenue streams in accordance with the rules of the ACM program. The advertising provider could alternatively be replaced by any of the intermediaries previously identified.

The merchants and supported organizations may be any type, whether local, regional, national, etc.

The ACM program may be administered either by a third party, a typical ACM program administrator, or the advertising provider, and may be operable to collect all information described below, disseminate relevant results to at least the advertising providers and merchants, and disseminate payments between the supported organizations, advertising providers, merchants, and members.

FIG. 1 illustrates a merchant registering with the ACM program using a boarding process of the advertising provider. The advertising provider may be an internet-based advertising provider such as a search engine provider, payment provider, or other online portal. Retailers that are not yet associated with the ACM program can become registered merchants 11 by registering with the ACM program using either the ACM program's existing merchant registration process 13 or a boarding process provided by the advertising provider 15 that can integrate 17 with the ACM merchant registration process.

Figure 2:
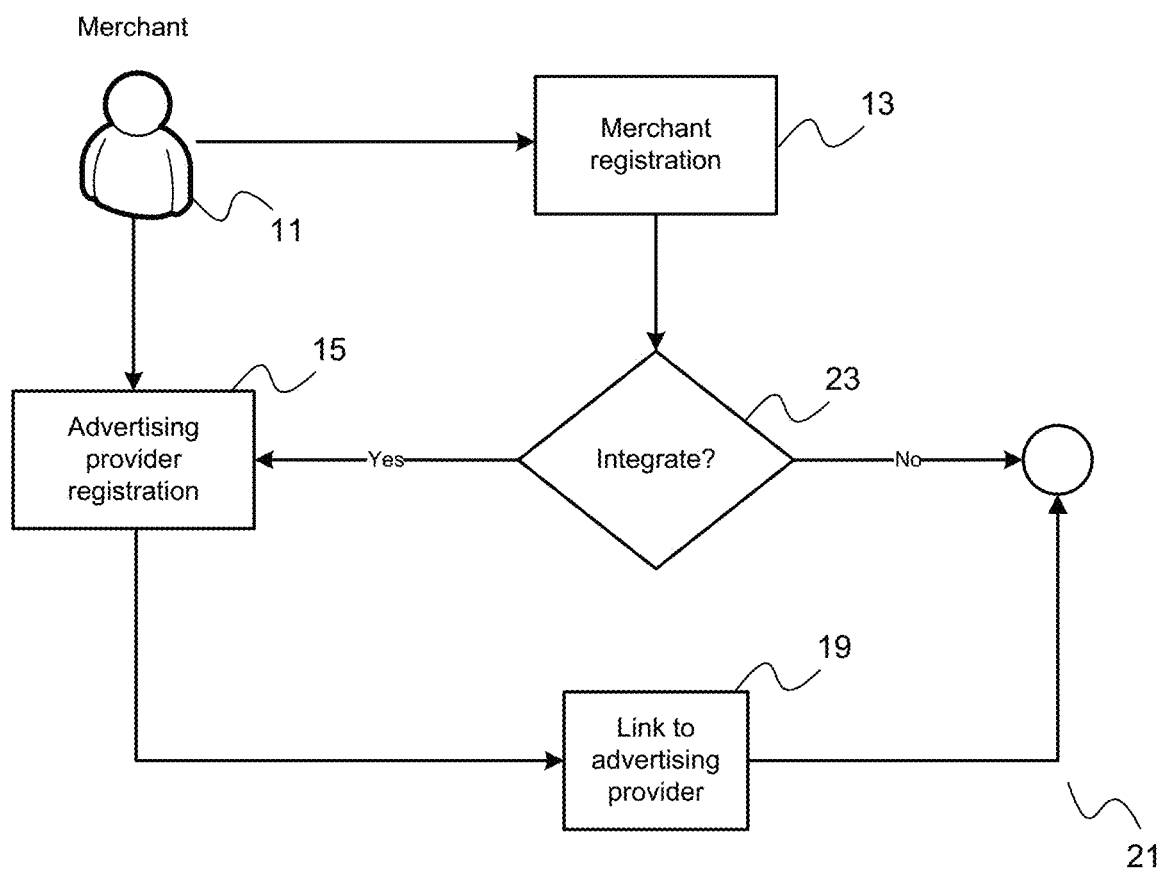
FIG. 2 illustrates a merchant registering with the advertising provider using a boarding process of the ACM program.

For example, an opt-in check box could be provided by the advertising provider to enable an integrated boarding process with the ACM program at the time that the retailer is registering with the advertising provider or modifying its registration with the advertising provider. If a retailer chooses to so opt in, the ACM program may retrieve required information regarding the retailer from the advertising provider, simplifying the registration process with the ACM program. The retailer is then a merchant (i.e. registered with the ACM program). Similarly, a merchant that is registered or registering directly with the ACM program could be provided with a means, such as a check box, that would enable the merchant to be linked to the advertising provider 19. FIG. 2 illustrates a merchant registering 21 with the advertising provider using a boarding process of the ACM program 13, which may be operable to integrate 23 with the advertising provider registration 15. Thus, the present invention enables retailers to leverage their existing partnerships for further consumer exposure.

The advertising provider could similarly enable a retailer to leverage its registration utility to provide an integrated boarding process for any other type of loyalty program, regardless of whether it includes an ACM program as herein described. In this manner, all of the following features may be adapted for the loyalty programs.

During the ACM program and advertising services registrations, the merchant may specify the rates at which contributions may be made to the one or more causes that it wishes to support and the fees it may pay to the advertising provider, respectively. In return for these payments, the merchant may be provided with enhanced analytics, as further described below. It should be noted that the merchant may also be making contributions to the causes in connection with transactions with members, which may be regulated by the rules of the ACM program.

The present invention also provides an advertising utility to track whether a member transacts with a merchant introduced to the member by an advertisement provided by the advertising provider. A typical online advertising provider is already equipped with means for charging the merchant a fee for displaying the advertisement and an additional fee each time the advertisement is clicked on by a member.

Figure 3:
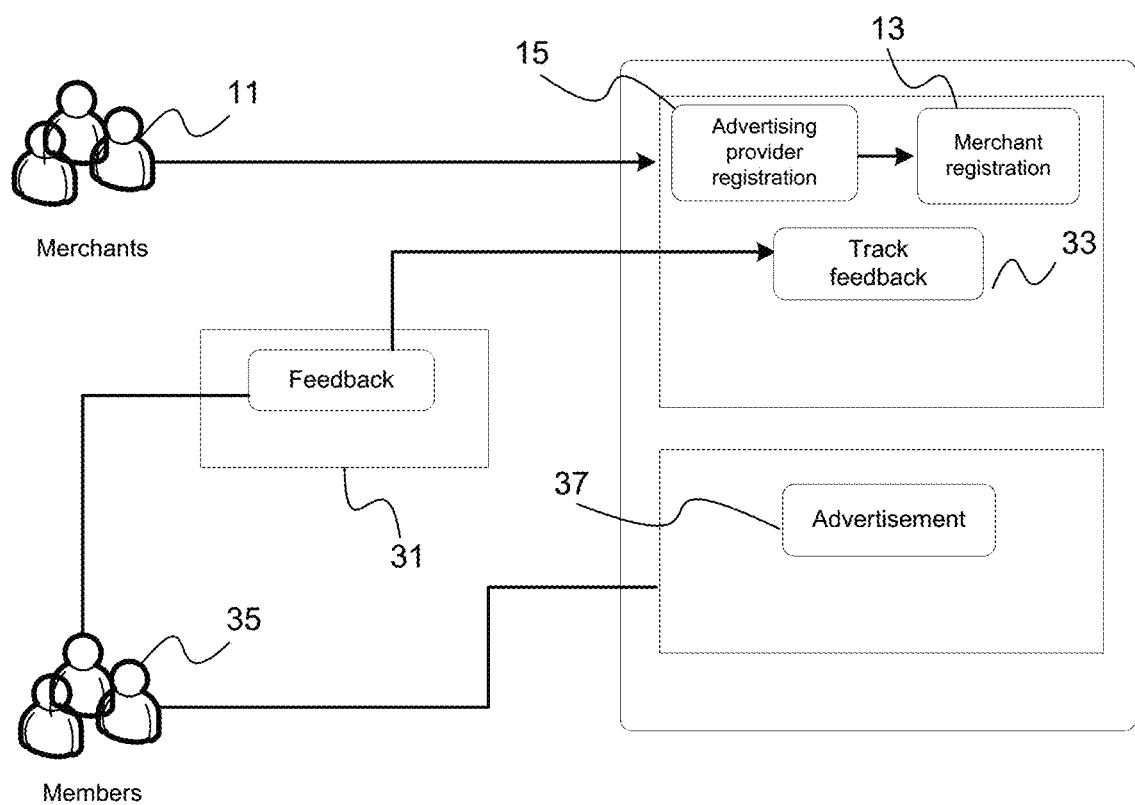
FIG. 3 illustrates the integration of an advertising provider's services with the ACM program, wherein survey responses are used to link transactions to advertisements viewed by members.

FIG. 3 illustrates the integration of an advertising provider's services with the ACM program, wherein survey responses are used to link transactions to advertisements viewed by members. The present invention enables the advertising provider to charge the merchant 11a further fee each time such a member 35 purchases goods or services from the merchant 11 as a result of having clicked upon the advertisement 37 provided for a member's search, whether the purchase is made online or offline (i.e. through what is commonly referred to as a "brick and mortar" store). By leveraging one or more of the ACM program features the advertising provider can encourage the member 35 to complete a feedback mechanism 31 for enabling the advertising provider to track 33 that the member 35 used the advertisement as an intermediate step in purchasing the goods or services. The feedback mechanism is described more fully below, but may for example be a survey that in part requests the member 35 to identify the means by which it discovered the merchant. If the member 35 confirms that it discovered the merchant 11 through an advertisement 37 provided by the advertising provider, the advertising provider may charge a fee to the merchant 11.

The use of an advertising provider and the ability of the advertising provider to track statistics associated with the efficacy of its advertising means are known to those skilled in the art. The tracking may be associated with, in a web based environment, the ability to track the number of times that an advertisement is displayed and the number of times a hypertext enabled advertisement is clicked on by a member. In accordance with the present invention, an advertising provider may be provided with a utility with which to track such statistics.

The present invention advantageously enables the advertising provider to also determine whether the advertisements it has provided result in a sale of goods or services between merchants and members, determine statistics associated with these sales, and can provide these statistics to merchants registered with the ACM program. In other words, the present invention enables advertising providers and merchants to obtain more measured results than are currently available. All of these metrics can be provided using the enhanced analytics of the present invention.

A merchant having an offline and/or an online presence may provide an advertisement to be viewed by members through an intermediary that is an advertising provider in such a way as to enable the advertising provider to track occurrences of members transacting with the merchant (for example, purchasing goods or services) by way of the advertisement. As such, the present invention enables a means for clearly capturing the advertising provider's role, and the efficacy of the advertisement, in a final transaction. An advertising provider may thus increase its advertising sales revenue by leveraging a merchant's final sale. Additionally, the merchant may be provided with enhanced analytics regarding its advertising efficacy.

Figure 4:
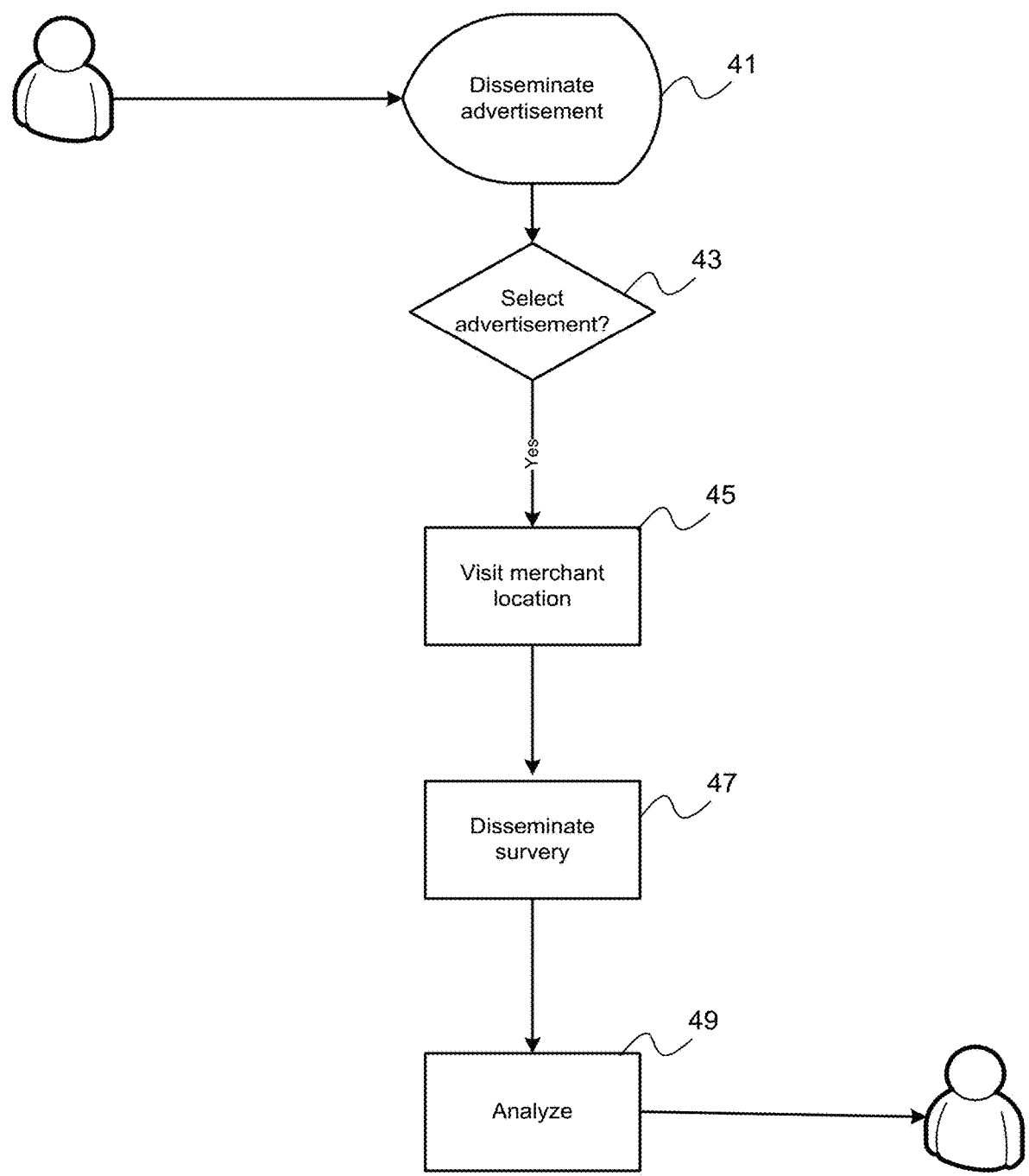
FIG. 4 illustrates a process for measuring utilization of search results by members resulting in transactions with offline merchants.

FIG. 4 illustrates a process for measuring utilization of search results by members resulting in transactions with offline merchants. Once the merchant is registered with the advertising provider, the advertising provider may disseminate 41 the advertisements to a member using a number of techniques known in the art, whether random dissemination, in association with demographic targeting, or by contextual targeting in association with a contextual search by the member, the advertising provider optionally also providing various other advertisements, internet links, or other information to the member. The analytics utility may identify the technique by which the advertisement is disseminated, including for example the contextual search that resulted in dissemination of the advertisement, and the member to which the advertisement is disseminated.

The analytics utility may additionally identify occurrences whereby a member selects 43 the advertisement to discover the merchant, for example by clicking a hyperlink associated with the advertisement. In one particular embodiment, by selecting the advertisement the member may be directed to a utility of the ACM program that profiles the merchant. The profile may include location information of the merchant along with reviews of the merchant based on previous members' feedback of the merchant. The previous feedback may be provided using surveys, which are described more fully below.

The member, having viewed the merchant's advertisement, may visit 45 the merchant's physical location and may transact with the merchant. Optionally, the transaction is performed using the token tied to the ACM program, such as a financial card, and use of the token signals to the ACM program that a transaction has been processed.

The ACM program may then disseminate a survey to the member upon the transaction having occurred. The survey in the present invention may enable the member to identify the particular means by which it discovered the merchant. Surveys could be targeted to particular members based upon that member's answers in a previous survey. Additionally, as will be described more fully below, offers can be targeted to particular members based on that member's answers in a previous survey.

The member may submit the survey to the ACM program. If the member identifies by means of the survey that the advertisement was the means by which it discovered the merchant, survey responses and the transaction details may be recorded in a database or other storage facility in accordance with the implementation of the ACM program. Along with other such transaction details compiled by the system, the analytics utility may be operable to analyze 49 the set of transaction details for the advertising provider and for each merchant so registered with the advertising provider. The information can be used for enhanced analytics as described more fully below.

The feedback mechanism (e.g. the survey) may also be operable to request comments from the member about its customer experience or other relevant information regarding its dealings with merchants. This information can also be stored in the database for reporting to the merchant using the enhanced analytics.

The surveys may also be used to generate reviews of the merchant and/or merchant location. The reviews can be accessed by members to assist them in determining whether to transact with the particular merchant presenting the advertisement.

Figure 12:
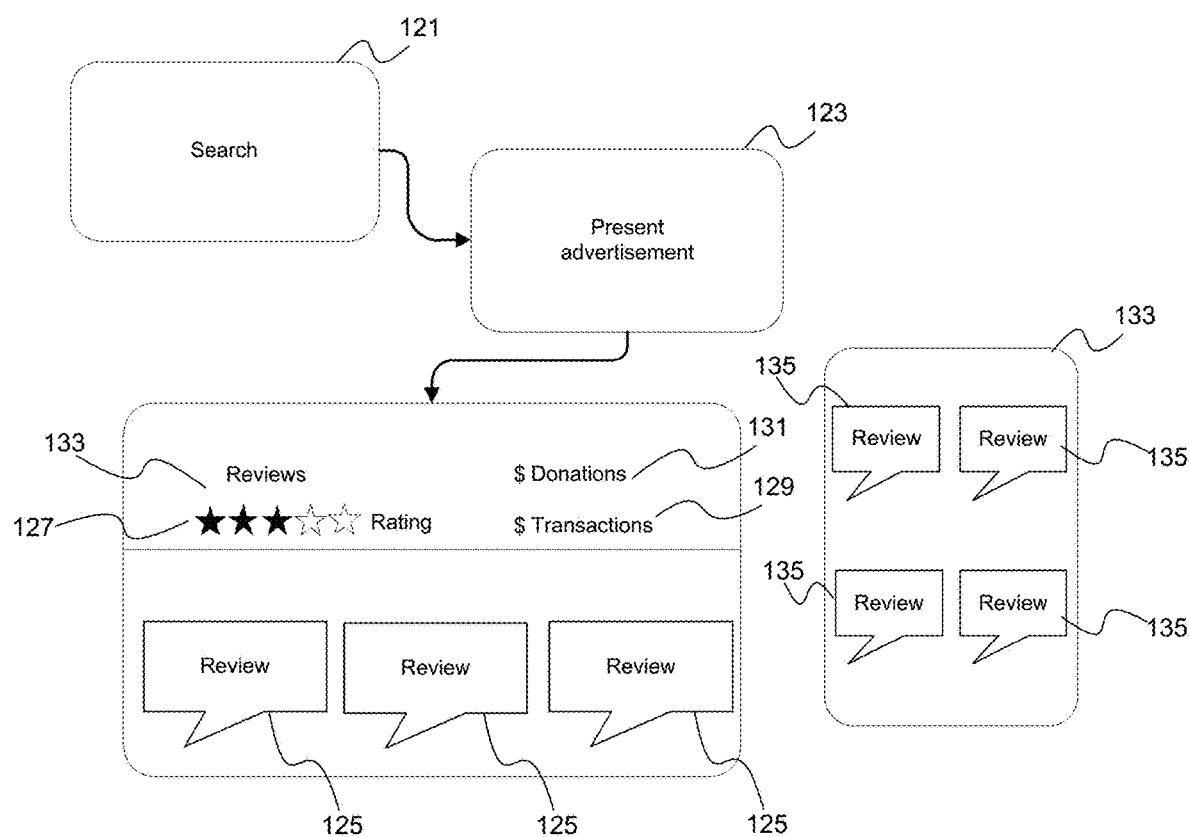
FIG. 12 illustrates a member accessing merchant reviews and ACM information generated from feedback received from other members corresponding to previous transactions with the merchant.

FIG. 12 illustrates a member accessing merchant reviews and ACM information generated from feedback received from other members corresponding to previous transactions with the merchant. When a member performs a search 121, the member may be presented with the merchant's advertisement 123 by means of the advertising provider, and may access all reviews 125 for that merchant and/or merchant location. The member may browse individual reviews 125 and be presented with additional information including, for example, merchant's average and/or total experience rating 127, transaction amount 129, donations raised 131, the number of reviews presented 133 or any other relevant information recorded by means of the ACM. Each of the reviews may be linked with its creator's member profile 137, including their demographic information and all other reviews 135 by that member, such that the currently browsing member can determine the relevancy and/or credibility of the review based on the reviewing member's other reviews.

Example Transaction

To better illustrate the foregoing, the following is one example transaction in accordance with the present invention. It should be understood that there are many other implementations for the systems and methods provided in the present invention, in accordance with aspects thereof.

Figure 5:
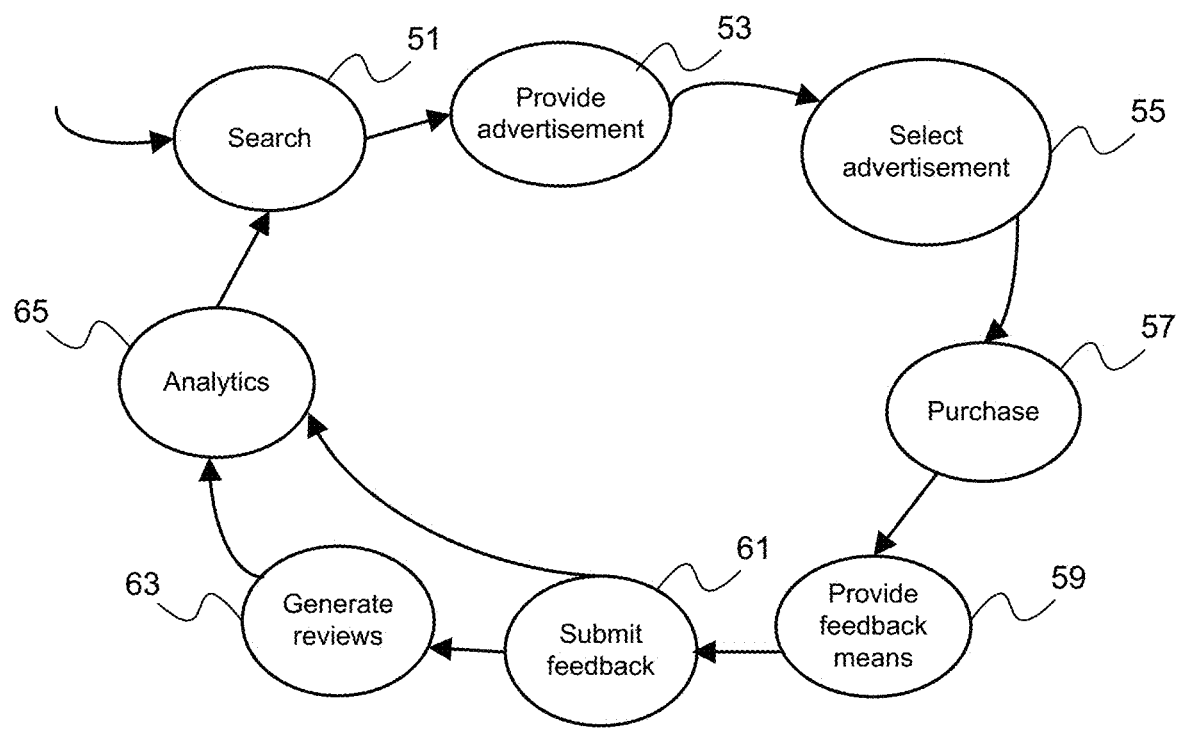
FIG. 5 illustrates an advertising provider enabling use of an ACM program by an offline merchant enabling transactions with ACM members.

FIG. 5 illustrates an advertising provider enabling optimal usage of an ACM program for a merchant. The advertising provider may be an internet searching means that displays, to a member, context sensitive advertisements.

An online or offline merchant may register through the typical enrollment steps required by the advertising provider, and also indicate that it wishes to participate in the program of the present invention that is enabled by the advertising provider. The merchant registration may be in accordance with the methods previously described and illustrated in FIG. 1 and/or FIG. 2.

A member may wish to benefit one or more supported organizations and, therefore, be interested in purchasing goods or services from merchants that are tied to an ACM program associated with the one or more supported organizations. The member may be provided with an internet searching means provided by the advertising provider. The member may search 51 for specific goods or services of interest that happen to be provided by the merchant, and the advertising provider may correspondingly provide the member with the merchant's advertisement as part of its search results 53. The member may follow a hyperlink corresponding to the advertisement 55, which may identify means by which to find the merchant's physical store location as well as reviews of the merchant by other members. The advertising utility may record that the member has clicked the hyperlink corresponding to the advertisement, and charge a fee to the merchant in accordance with the agreement between the advertising provider and the merchant.

The member may, after optionally accessing member reviews associated with the merchant as well as reviews of other merchants reviewed by those members and demographic information of those members, visit the merchant's physical store location and may purchase 57 the goods or services from the merchant. The purchase may be made using a token such as a stored value card or financial card linked to the ACM program. An ACM program may record a transaction made using the card and/or the ACM program may provide the member with a feedback means 59 corresponding to the transaction and tying the member and merchant with the transaction. The advertising provider and the merchant may provide the member with an incentive, such as a reward or an offer as permitted by the rules of the ACM program, to encourage the member to complete the feedback means.

Part of the feedback means may ask the member to indicate how the member initially discovered the merchant, which in this case may be the advertisement. The feedback means may also request that the member provide comments regarding its customer experience with the merchant, which may be later provided as reviews 63 for the benefit of other members. The member may then activate a means for submitting the feedback means 61 back to the ACM program, in accordance with the particular implementation of the ACM program.

If a feedback means identifies the advertising provider as the intermediary that introduced the member to the merchant, the advertising provider may then charge the merchant a corresponding fee for providing the advertisement that resulted in the sale.

Furthermore, both the advertising provider and the merchant may be provided with the enhanced analytics 65 further described below, resulting from the gathering of information related to the efficacy of the advertisements in connection with the sale.

Other implementation extensions may be provided. For example, the merchant, having been discovered by the member, may provide a coupon with a bar code to be directed electronically to the member through the advertising provider or through the ACM program. The member can then print the coupon and present it at the merchant's physical location while the transaction is taking place. Use of the coupon may enable the ACM program to provide the member with a feedback means, rather than requiring the member to use a card linked to the ACM program.

A feedback means, such as a survey, may not be required in order to enable flow-through of benefits to the one or more supported organizations and payment to the advertising provider. Where a merchant has an online store, a tracking means such as a cookie may be provided to determine whether the advertising provider enabled the sale by the merchant. Where a merchant does not have an online store, the offer such as the coupon may be encoded such that it identifies the advertising provider. The encoded coupon may, therefore, be the feedback mechanism. Upon use of the offer, the ACM program may be notified to provide payment to the advertising provider and the one or more supported organizations.

As would be clear to those skilled in the art, the present invention may be of great commercial value in that each of the ACM program, the advertising provider, and the merchants are provided with a much greater customer base through enhanced customer acquisition while the member is given a new means of directing contributions to one or more desired supported organizations by transacting more often with merchants tied to the ACM program.

Mobile Communications Facility

The present invention also discloses a mobile device utility that can be used with an ACM program to further enhance the systems and methods described above. The mobile device utility may receive and deliver content between the ACM program and a member's mobile device using SMS/MMS, cellular network, wi-fi, satellite, radio frequency, infrared, Bluetooth, NFC or other wireless mobile communications mediums and protocols. The mobile device utility may transmit and receive information using a secure protocol. The mobile device and/or the mobile device utility may also receive and transmit data with a point of sale facility of a merchant.

The mobile device may be a computing device with at least one processor, at least one memory, and a network interface for wireless communication. The mobile device may also have a display screen to display a GUI. An example mobile device is a wearable device such as an article of clothing or an accessory that incorporates computer hardware.

The mobile device may be used as a payment device. For example, the mobile device may non-transitorily store an electronic representation of a financial card on memory so that the mobile device may be used by a member as payment for transactions with merchants. The mobile device may receive data related to the financial card and transmit data related to the financial card to implement operations for transaction processing. For example, a merchant may have an electronic point of sale facility that electronically interacts with mobile device with financial card data stored thereon to process the payment. As another example, the mobile device may interact with the mobile device utility to receive and transmit financial card data. An example mobile device is a wearable device that may receive, store, and transmit the financial data and act as a financial card.

A mobile device may store electronic representations of multiple different financial cards to provide a virtual or electronic "wallet". The ACM program may also be used to manage multiple different financial cards where updates may be synchronized to the mobile device. An interface may provide card management features to enable a user to navigate available financial cards (represented as icons, graphical representations of cards, and so on), select a financial card for payment for a given transaction, and authorize the transaction.

The mobile device utility is operable for any ACM program and, in particular, should not be considered limited to an ACM program where merchants and supported organizations are of any particular type, whether local, regional, national, etc.

The mobile device utility may be synchronized in real time or near real time with the ACM program. For example, if content such as surveys, offers, rewards, or contests are disseminated using the mobile device utility that content may not be made available to the same member using a typical portal to the ACM program, such as the ACM program web site. Similarly, if the member receives content while using the typical portal to the ACM program that content may not be made available to the same member via the mobile device utility. It should be noted that if the ACM program typically records the information exchanged between the ACM program and the member, the ACM program could be adapted to also record associated information exchanged with the member using the mobile device utility such that the mobile device utility may be a seamless addition onto the typical ACM program.

Optimally, the recording features of the ACM program would be operable to identify which information is exchanged using the mobile device utility, since such information may be desired by parties associated with the ACM program. This information can be advantageously used to provide advanced analytics in connection with the movements of and transactions of members. For example, mobile specific reports may be generated for a merchant or intermediary or across the entire ACM program or a subset thereof, whereby information is provided related to all facets of member-mobile interaction including mobile surveys, mobile reward redemption, and mobile contest entries. These reports can be used by merchants to determine whether to issue rewards based on location tied to a member's prior shopping patterns or based on inventory variables. The recording features may also collect and record information relating to transaction processing including identification of which financial cards are used for payment for transactions, if a mobile device is used for payment, and so on.

A member may provide its mobile device information to the ACM program using any of a number of methods. The mobile device information may include one or more financial cards stored thereon which may be used for transaction payment. The member may navigate to the ACM program interface, such as a web site, authenticate as a registered member (in accordance with the ACM program details), select a link corresponding to mobile device setup and then provide the mobile device information such as phone number or other identifier. Alternatively, a member may access the web site using the mobile device. In this case, a web page tailored to a mobile device may be displayed to the member. The member can provide authentication information, and once the ACM program validates the member, the active mobile device can be associated to the member's ACM program profile without the member needing to manually enter it. An unsuccessful authentication in either implementation can be handled by the ACM program by providing the member with an alert that authentication failed.

Figure 6:
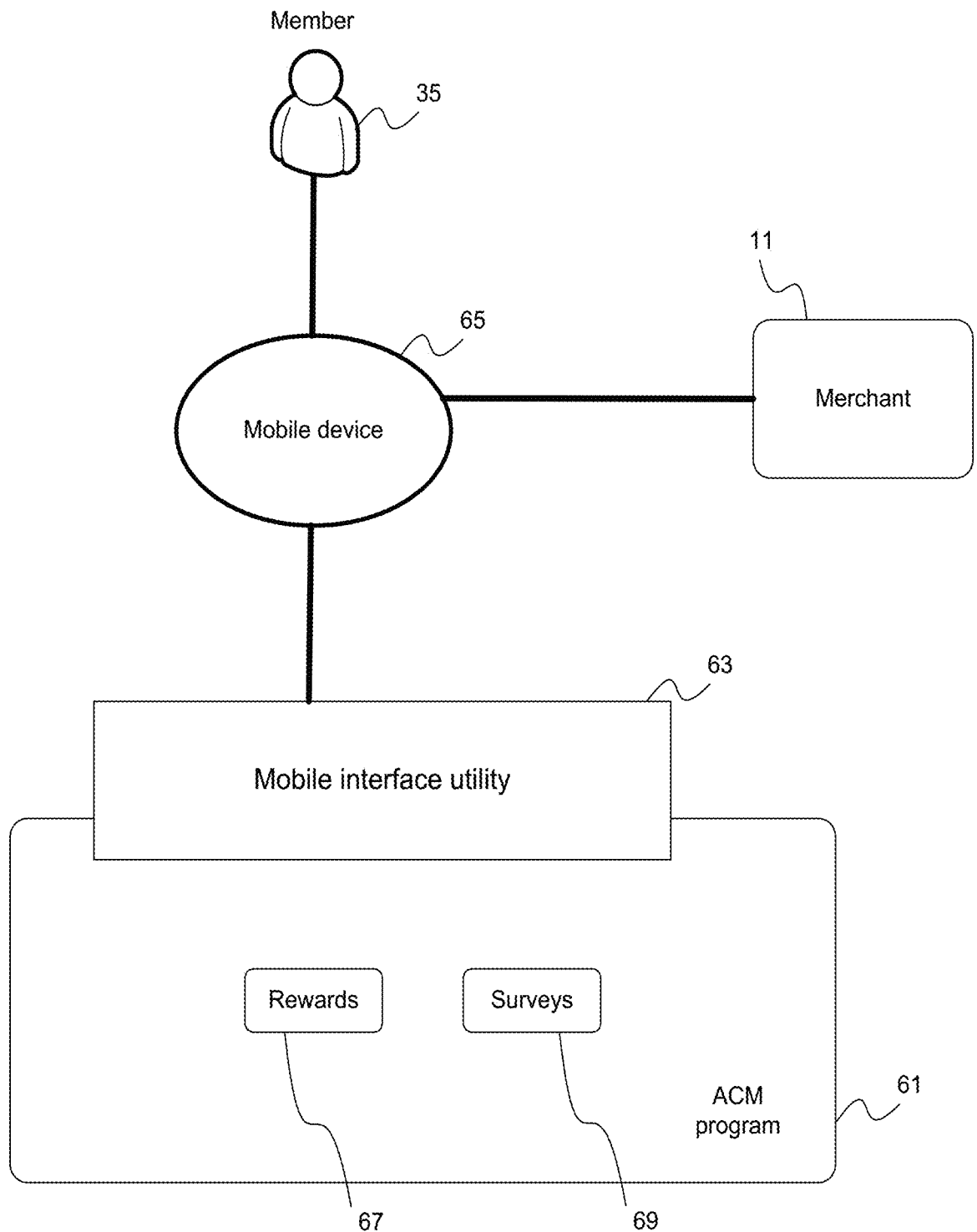
FIG. 6 illustrates ACM program features enabled using a mobile device.

FIG. 6 illustrates ACM program features enabled using a mobile device. The ACM program 61 may include a mobile interface utility 63 operable to interface with the mobile device 65. A mobile device 61 such as a mobile phone or a smart phone may be provided to enable optimal transacting between the ACM program 61, the member 35, and the merchant 11, in accordance with which numerous features of the ACM program may be implemented. These features may enable increased marketing opportunities for merchants by, for example, increasing member awareness of merchant locations (and thus system activity), increasing reward 67 dissemination and redemption and survey 69 responses (and thus system activity), increasing ease of transaction processing, and increasing ease of use by members of the ACM program.

Figure 7:
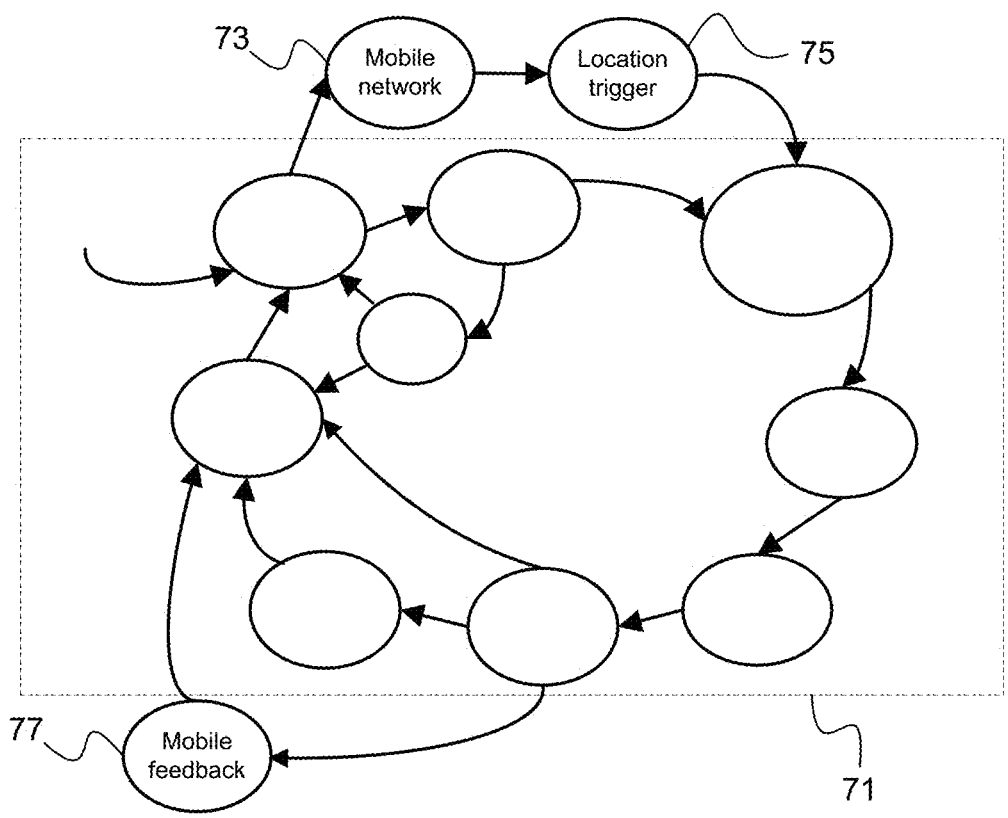
FIG. 7 illustrates the present invention whereby a member's mobile device is incorporated optimally into an ACM program.

FIG. 7 illustrates the present invention whereby a member's mobile device is incorporated optimally into an ACM program. The mobile interface provided may augment the typical usage of the ACM program as previously illustrated 71 in FIG. 5 by leveraging a mobile network 73 and location based triggers 75. In addition, a member may provide feedback 77 by means of the member's mobile device. Further, the mobile interface may provide a graphical representation of one or more financial cards stored on mobile device for selection for payment for the transaction so that the mobile device may be used a payment device. As described herein, transaction may trigger contributions to supported organizations. The mobile interface may display a graphical representation of the supported organization and the contribution thereto based on a transaction between a member and a merchant. The member may customize the communications received and sent through their mobile device. For example, a member may define a list of preferred merchants wherein features associated with the mobile device utility are only operable in association with merchants within the preferred merchants list. The list may be defined within the ACM program either using its typical interface (such as ACM program web site) or on a mobile device interface of the ACM program (also referred to herein as the mobile ACM program).

The preferred merchants list could be defined by a member using the ACM program interface by navigating to and authenticating with the mobile ACM program and authenticating with the ACM program. Upon authentication, a list of merchants may be displayed to a member. A searching means could also be provided to the member so the member may search for merchants by name, category, location, or other criteria. The member may add merchants using either the list or the searches. A link may also be provided to the current preferred merchants list for the member. The member may be provided with a means to delete one, some, or all of the merchants on the list so they are no longer preferred merchants. Alternatively, the member may delete a merchant from the list upon receiving an offer, reward, survey, or contest from the merchant on the mobile device. Furthermore, the member may customize the types of communications to be received from each preferred merchant.

Additionally, when offers, rewards, surveys, or other communications are received on the mobile device, a member may associate its corresponding merchant with the preferred merchants list or remove it from the preferred merchants list. The member could also block the particular type of communication from that merchant using the preferred merchants list. It should be understood that all of the following features may be limited to the preferred merchants or may be operable for all merchants depending on the particular ACM program implementation and the member's preferences. The following features could similarly be limited to merchants offering particular types of goods or services, or by any other type of categorization. Furthermore, the mobile device utility may be provided with a means allowing the member to determine which of the following features would be enabled.

Full access to the ACM program features may be provided using the mobile device. For example, an ACM program available through the internet may make available a simplified interface, or the ACM program interface, to be viewed on a mobile device operable to browse internet web sites. This may be typically enabled by mobile devices commonly known as smart phones.

The member may effect a search using the advertising means and be introduced to a merchant, as described above. If the merchant does not provide an online store, the merchant may be enabled to direct an offer to the member's mobile device using the mobile device utility. Upon transacting with the merchant, the member need only present the offer as displayed on the screen of the mobile device rather than have to print a coupon or other offering means. For example, a bar code may be displayed on the screen of the device.

The mobile device utility may also enable real time delivery of a feedback mechanism, such as a survey, after a transaction between the member and a merchant. The member could choose to complete the feedback mechanism immediately or soon thereafter rather than at a later time using a more traditional facility provided by the ACM program, such as via a computer connected to the internet. In other words, the member can complete the feedback mechanism on their mobile device at a time approximate the transaction.

Such a mobile device utility may therefore greatly enhance the ease of use and timeliness of use of the invention described herein. The transaction may also result in a member being provided with a gift card in accordance with the rules of the ACM program. If the gift card requires activation, the mobile device utility could be used by the member to activate the gift card immediately. For example, the member may navigate to and authenticate with the mobile ACM program and be provided with a link to a gift card web page. The member may input the gift card number and optionally be provided with a survey which, when completed, activates the gift card. A confirmation message may be sent to the mobile device as well.

The mobile device utility may enable other aspects of the ACM program to be directed to the member regardless of where they are located at the time. For example, the mobile device utility may provide content such as rewards, offers, contests, and surveys, in accordance with its rules, to the member. For example, a member may navigate to and authenticate with the mobile ACM program. The ACM program may provide to the member a list of contests that the member can participate in. The member may browse the list and select the particular contest to participate in. The ACM program may require the member to complete a survey to enter the contest. The member may complete the survey, enter the contest, and the ACM program may send a confirmation message to the mobile device.

Furthermore, a member may, on the mobile device, search, receive, and redeem rewards and special offers for a merchant. For example, the member may navigate to and authenticate with the mobile ACM program and be provided with a link to a web page to search rewards. The member may input a postal code/zip code, telephone area code, or other location defining information, and be provided with a list of nearby merchants offering rewards. As another example, location tracking mechanisms on the mobile device may automatically determine and provide location data to mobile device utility for provision to ACM program to determine nearby merchants. The member can browse the rewards and save rewards of interest. Saving a reward may result in downloading the reward details to a local storage means of the mobile device. The reward may also be accessible using the traditional ACM program access portal (i.e. not on the mobile device). The reward details may include a bar code to scan at the merchant's point of sale. A member may access their saved rewards at any time, but the rewards may be removed once they are used by a member, if the reward is to be so limited.

Alternatively, the member may search rewards by location. For example, the member may access and authenticate with the mobile ACM program and be provided with a link to a web page to search rewards based on merchant name and optionally a radius. The search may be populated automatically by location tracking mechanisms on the mobile device. The ACM program may provide results being either the merchant or a number of merchants within a defined radius of the named merchant. The member may browse the rewards and save rewards of interest. Saving a reward may result in downloading the reward details to a local storage means of the mobile device. The reward may also be accessible using the traditional ACM program access portal (i.e. not on the mobile device). The reward details may include a bar code to scan at the merchant's point of sale. A member may access their saved rewards at any time, but the rewards may be removed once they are used by a member, if the reward is to be so limited.

A member that has previously been offered a reward from a particular merchant may, when the member is near the location of the merchant, download the reward details to the mobile device so that the reward can be redeemed at the merchant location. Alternatively, a member may be at a location that the member is aware is near a merchant. The member may use the mobile device utility to search the ACM program for special offers available with the particular merchant. If special offers are available, the member may be more likely to transact with the merchant at that particular time. For example, the member may access and authenticate with the mobile ACM program and be provided with a link to a web page to search merchants for rewards based on merchant name. The member may optionally filter the search by business category or minimum contribution percentage. The ACM program may provide a link to view the merchant's location and rewards as well as contribution information relating to the member's transactions at the merchant. The member can browse the rewards and save rewards of interest. Saving a reward may result in downloading the reward details to a local storage means of the mobile device. The reward may also be accessible using the traditional ACM program access portal (i.e. not on the mobile device). The reward details may include a bar code to scan at the merchant's point of sale. A member may access their saved rewards at any time, but the rewards may be removed once they are used by a member, if the reward is to be so limited.

Mobile devices may be equipped with means for location tracking, such as global positioning system (GPS). Where a particular member has a mobile device equipped with GPS, various location based and proximity based services could be provided to the member. Location based and proximity based services may require a mobile device that can receive what are commonly referred to as push services, for example A mobile device proximate to a merchant location (as detected by location tracking mechanism) may automatically receive rewards relating to the merchant location. As a further example, a merchant may have an in-store computing device configured to interact with mobile device and/or mobile device utility. The in-store computing device may be a point of sale facility, for example. The in-store computing device may detect a proximate mobile device and transmit command messages to trigger dissemination of rewards or other communications to mobile device from ACM program mobile device utility.

As another example, a mapping feature could be provided to a member so that the member could be given the location of a number of nearest merchants, or a number of nearest merchants offering a particular type of good or service, or the nearest preferred merchant. In addition, offers for nearby merchants could be sent to the member via mobile device, or in-store communications could be provided to members in association with content including offers, rewards, contests or other announcement. Optimally, the content may be delivered to the member's mobile device at approximately the time the member enters the store, comes within a particular distance of the store, or passes directly in front of the store. The content may include any type of data including text, rich text such as HTML, audio, video, or images. The content could be for any purpose, including advertising a sale, or for highlighting a specific manufacturer or a specific product.

Correspondingly, a merchant could access through the ACM program interface a mapping feature displaying members that are nearby. The merchant could then target rewards or otherwise attract those members to the merchant location.

Further still, the member could search for rewards or offers corresponding to all nearby merchants. The nearby merchants could also be selected based on past searches performed by the member, such that the merchant could be one that sells goods or services previously sought by the member. Merchants could also tailor the particular offers based on the member's transaction history with the particular merchant or the transaction history of the member with the ACM program generally, or with merchants in the same general field of sales as the particular merchant.

The mobile device utility may also be used to provide news updates to members. The news items could be "pushed" to the mobile device, or could be requested by the member. For example, the member may navigate to and authenticate with the mobile ACM program, and be provided with a link to a news page. The news page may provide a set of news items, and the member may select a news item to view the details of the item. Optionally, the ACM program will filter news items so that it displays only those items associated with the present location of the mobile device.

Figure 13:
FIG. 13 illustrates example schematics of interfaces for mobile devices.

FIG. 13 illustrates example schematics of mobile interfaces for a mobile device. In this example, the mobile device is a wearable device such as a watch with computer hardware and a display screen. When the mobile device enters or is proximate a merchant location, a welcome interface 150 may trigger for display on the display screen of the mobile device. The welcome interface 150 may identify the merchant and data relating to the merchant. The welcome interface 150 may include a reward or offer. The welcome interface 150 may trigger by mobile device utility upon detecting that the mobile device is proximate to a location of a merchant, such as through location tracking. The welcome interface 150 may be triggered by merchant in-store computing device upon detecting that the mobile device is proximate to a location of a merchant, which may trigger a message directly with the mobile device or indirectly through mobile device utility.

An offer or reward interface 152 may trigger for display on the display screen of the mobile device. The reward interface 152 may identify an offer or reward based on a transaction at the merchant location. For example, the reward interface 152 may identify an offer or reward for a contribution to a supported organization based on a transaction at the merchant location. The reward interface 152 may provide a message or view of the merchant's commitment to the community. This may provide an incentive for the member to transact with the merchant, as described herein. The contribution may also be based on the financial card used for the transaction to encourage or provide an incentive to use a particular financial card for a transaction over another financial card, for example.

A payment interface 154 may trigger for display on the display screen of the mobile device. The mobile device may interact directly with a point of sale facility of the merchant to process the payment for the transaction. The mobile device utility may implement data exchange with the ACM program for data relating to the transaction.

A charity interface 156 may trigger for display on the display screen of the mobile device. The charity interface 156 may identify a contribution to a supported organization based on the transaction at the merchant location. The contribution may relate to an individual transaction or an aggregate of multiple transactions. The mobile device may have devices that physically interact with the member to provide notification of the contribution. For example, after walking out of a merchant location after making purchase and the member may feel a buzz on their arm, then with a quick glance at the wearable device they will see a notification regarding a contribution to one or more supported organizations. For example, the notification may be a thank you message from a young girl with a toothy smile in a hospital bed included in the image is the donation amount and logos or names of the supported organization, merchant and issuer. The mobile device utility may deliver the right message to the right mobile device at the right time (e.g. proximate to the transaction). For example a phone may have a much larger display screen that can be leveraged for a more detailed message but may not be visible or convenient to view if it is in a pocket or buried in a purse, so other wearable device display screens may be used for the message.

Additional interfaces may be provided on a mobile device. For example, a feedback interface may be provided which includes one or more feedback mechanisms.

Accordingly, mobile devices may further tighten an emotional connection between the issuer of the financial card, the merchant, and the member based on contributions to supported organizations. As that bond strengthens, the member may start to want to use a particular financial card more or transact with a particular merchant more. The member may more often put aside other forms of payment to use the preferred financial card that triggers contributions to supported organizations.

Mobile devices including wearable devices may strengthen personal interaction with the world, supported organizations, issuers and merchants.

Figure 14:
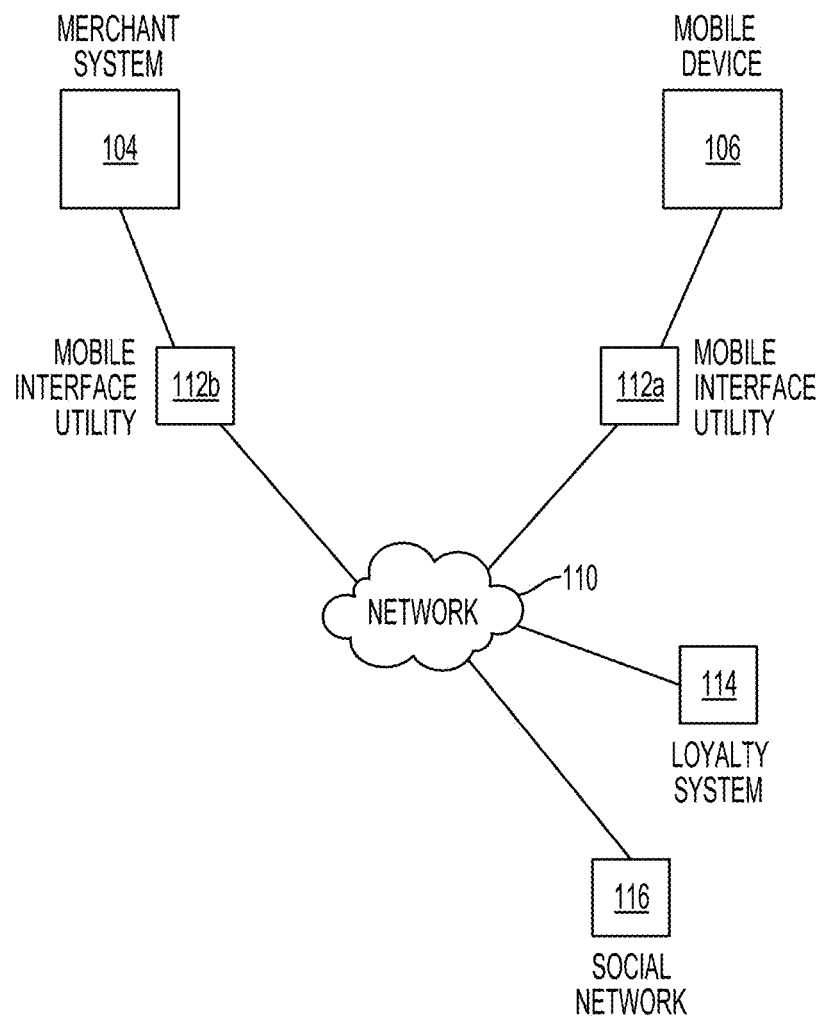
FIG. 14 illustrates a schematic diagram of a system for automated cause marketing using mobile devices.

FIG. 14 illustrates a schematic diagram of a system for automated cause marketing using mobile devices. As shown, the system may include one or more merchant systems 104, one or more mobile devices 106, and a loyalty system 114 for providing loyalty programs according to some embodiments. The system further includes a mobile interface utility 112a connecting one or more mobile devices 106 to loyalty system 114 via network 110. In some embodiments, merchant system 104 may have one or more mobile device components and a mobile interface utility 112b may connect one or more merchant systems 104 to loyalty system 114 via network 110. The system may also include a social network 116 or components implementing an API for a social network 116. The social network may facilitate dissemination of reward and contribution related data.

Loyalty system 114 provides a loyalty program for members and merchants. Loyalty system 114 may be an automated cause marketing ("ACM") program with a fundraising component as described herein. An ACM program automates dissemination of benefits to several parties involved in fundraising, including one or more supported organizations (for example, charities), merchants, and members. Flow-through to the supported organizations may be maximized in the ACM model.

Merchant system 104 may include various connected hardware devices. For example, merchant system 104 may include at least one processor, at least one data store, at least one network communication interface, a transceiver for transmitting transaction related data, and for receiving payment, rewards, and other transaction related dated, for example. A merchant may use the merchant system 104 to process transactions with members and receive rewards for redemption.

Merchant system 104 may include a transaction device including point of sale device, NFC device, code reader, or other device for processing transactions. Merchant system 104 may include one or more software components, such as a loyalty application, transaction firmware, and so on. Merchant system 104 may connect to the core loyalty system 114 via a network 110, such as for example one or more public or private networks for an online mode. Merchant system 104 may also feature an off-line mode.

Mobile device 106 may include various connected hardware communication devices, such as a wearable device, and so on. For example, mobile device 106 may include at least one processor, at least one data store, a transmitter for transmitting location, transaction and reward related data, and a receiver for receiving transaction, reward, and notification related data, for example. Mobile device 106 may include one or more input devices, such as a keyboard, mouse, camera, touch screen and a microphone, and may also include one or more output devices such as a display screen and a speaker.

Mobile device 106 is operable by a member of a loyalty program (managed by loyalty system 114). The member has a financial card, which may be an electronic or virtual card stored on a mobile device as a financial card token for example. The financial card may include machine readable indicia stored in a local data store. The cardholder device 106 may also include a radio-frequency identification (RFID) device, or other near-field communication (NFC) device to exchange data with a merchant system 104, for example.

Mobile device 106 may implement transaction and loyalty operations using tokens, in some embodiments. A token may be used with a physical device that identifies and authorizes a member for specific actions relating to one or more financial cards, transactions, rewards, and so on. The token may store temporary or permanent cardholder identification data, financial data, cryptography keys, digital signature, biometric data, and so on. There may be additional types of authentication required, such as PIN, password, and so on. A token may be used with a dedicated hardware device, secure element, or secure component. A token may be associated with a configuration file to define data fields associated with the token. The token may be encrypted for additional security.

A member may use mobile device 106 to transact with merchant systems 104 using tokens, receive reward related data, provide feedback related data, receive notifications regarding contributions, and so on. Mobile device 106 may include one or more hardware components such as a processor, memory, display (e.g. touch display), mobile phone components, NFC device, location device, secure transaction token data store, and so on. Mobile device 106 may include one or more software components, such as a loyalty application, transaction firmware, and so on. Mobile device 106 may connect to the core loyalty system 114 via mobile device utility 112*a* and network 110, such as for example one or more public or private networks for an online mode. Mobile device 106 may also feature an off-line mode.

The mobile interface utility 112*a/b* may augment the typical usage of the ACM program by leveraging a mobile network (which may form part of network 110), along with location based triggers and time based triggers for reward dissemination. In addition, a member may conveniently redeem rewards, process payment for transactions, and receive notifications of contributions using mobile device 106. The mobile device utility 112*a* may also enable real time delivery of rewards to mobile device 106 for redemption at a location linked to a merchant when the mobile device is proximate to the location.

Figure 15:
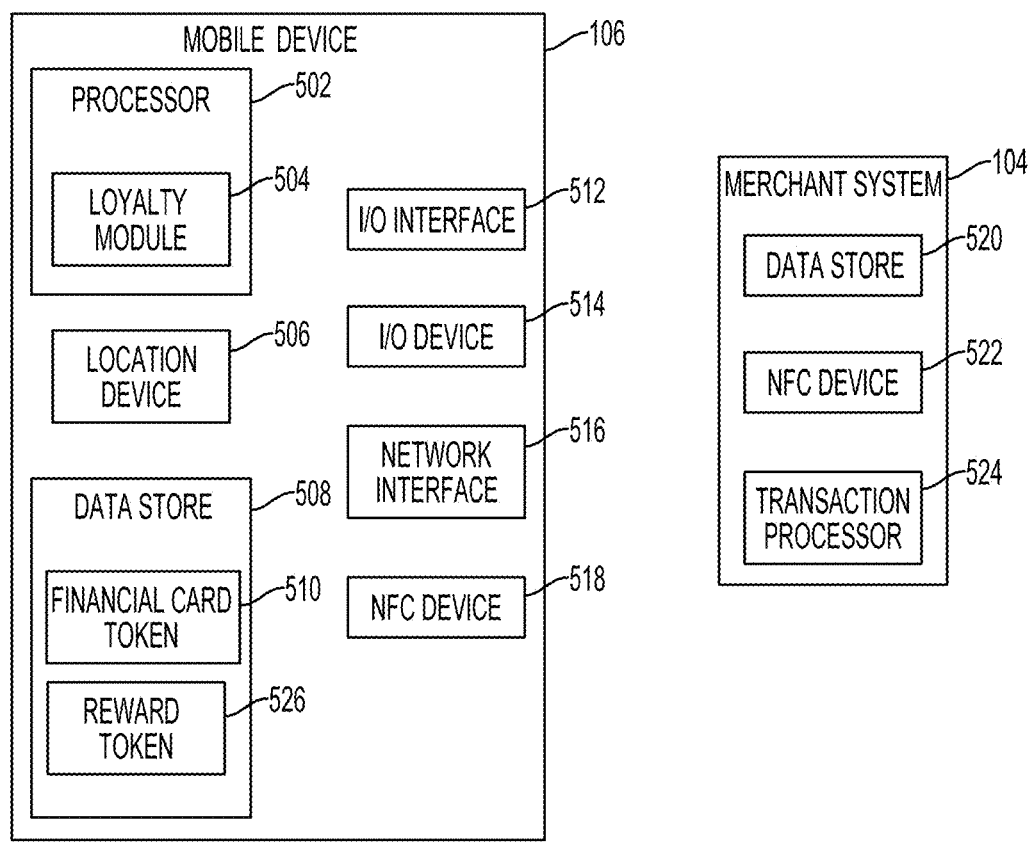
FIG. 15 illustrates a schematic diagram of a system for processing transactions between members and merchants using mobile devices.

FIG. 15 illustrates a schematic diagram of mobile device 106 and merchant system 104 for exchanging transaction and reward data.

Mobile device 106 includes a processor 502 configuring a loyalty module 504 to provide a portal to loyalty system 114 via mobile device utility 112*a*. Mobile device 106 has a location device 506 for tracking and generating location data which in turn generates events to trigger reward and notification dissemination, and other location based services.

Mobile device 106 initiates and processes transactions with merchant system 104 via a financial card token 510 configured with financial data. The financial data may include default credit card information and authorization, for example. Transaction data signals are exchanged via near field communication (NFC) devices 518, 522 to execute the transaction for goods or services. Mobile device 106 may provide a virtual wallet for member and provide the vehicle for the transaction via tokenization. This enables the member to directly transact with the merchant using mobile device 106. This may reduce overhead transaction costs. Transaction processor 524 processes the transaction between mobile device 106 and merchant system 104 to generate a transaction notification for transmission to loyalty system 114. Transaction details may be stored in data store 508, 520. Data store 508, 520 may be any type of electronic memory that is located either internally or externally such as, for example, RAM, ROM, CDROM, electro-optical memory, magneto-optical memory, EPROM, and EEPROM, FRAM or the like.

Mobile device 106 receives and stores rewards as reward tokens 526 (e.g. electronic signals representing rewards) in data store 526. A reward token 526 may be used to redeem a reward of the loyalty program in association with the transaction. This enables the member to directly transact and redeem rewards with the merchant using mobile device 106.

Network interface 526 enables mobile device 106 to communicate with other networks, to access and connect to network resources such as mobile device utility 112*a* and merchant system 104, to serve an application, to access other applications, and perform other computing applications by connecting to a network such as network 110.

I/O interface 512 enables mobile device 106 to interconnect with input and output devices, e.g., peripheral devices or external storage devices. Such peripheral devices may include one or more input devices, such as a keyboard, mouse, camera, touch screen and a microphone, and may also include one or more output devices such as a display screen (with three dimensional capabilities) and a speaker.

Figure 16:
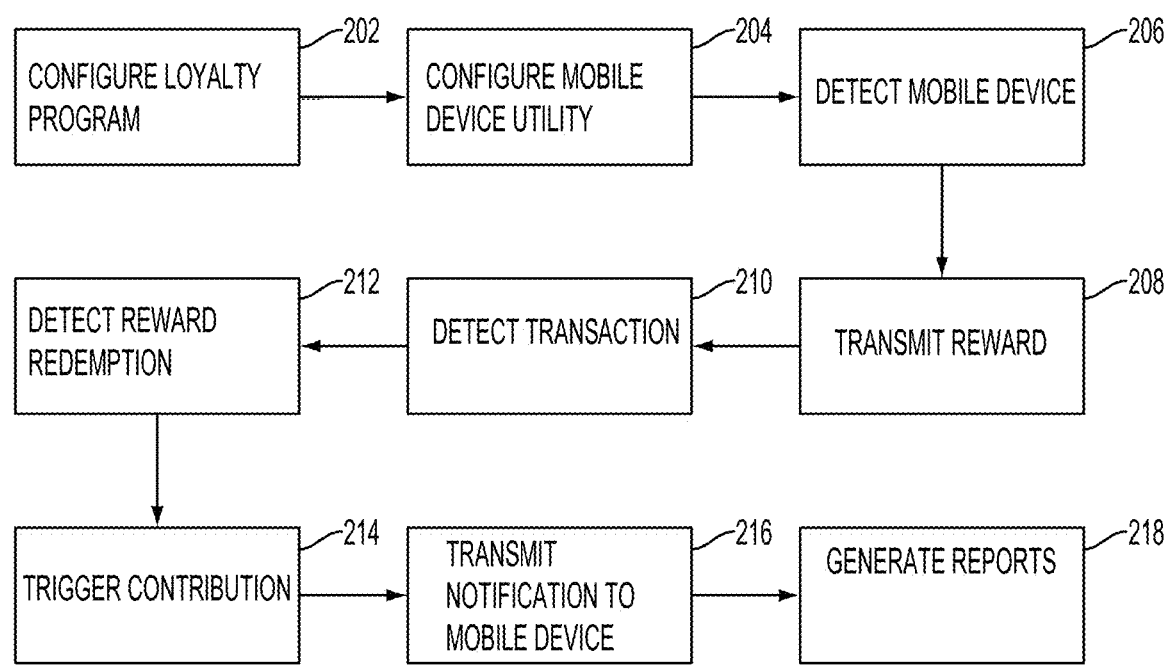
FIG. 16 illustrates a flow chart of a method for automated cause marketing using mobile devices.

FIG. 16 illustrates a flow chart of a method for automated cause marketing using mobile devices.

At 202, the loyalty program is configured using loyalty system 114. Further details regarding loyalty programs are described herein. The loyalty program has member profiles and merchant profiles. A member profile includes different fields such as, for example, demographic data, financial card data, supported organization data, a member identification, and mobile device information. Each field may have one or more associated values. For example, financial card data may have multiple values for different financial cards linked to the member. Information received by loyalty system 114 that corresponds to one or more values of different fields of member profiles may be used to search and locate a member profile. Each merchant profile includes different fields such as, for example, a merchant identification and a location. Each field may have one or more associated values. For example, a merchant may have stores at different locations and so the location field may have multiple values for the different locations. The loyalty engine creates rewards for members of the loyalty program using the demographic data, the supported organization data, and the locations associated with the merchants. The rewards define rules for contributions to supported organizations based on transactions.

At 204, the mobile device utility 112*a*/112*b* is configured to interface with mobile device 106. The mobile device utility 112*a*/112*b* provides an interface between the loyalty system 114 and mobile devices 106 to enable optimal transacting. Further details regarding mobile device utility 112*a*/112*b* are described herein.

At 206, mobile device utility 112*a*/112*b* detects a mobile device 106 at a location within a predefined distance of a location identified in a merchant profile. The mobile device utility 112*a*/112*b* interfaces with location tracking hardware of mobile devices 106 to track locations and correlated the tracked locations to locations of merchant profiles. The tracked locations may be timestamped to generate a trajectory of locations of a mobile device 106 over time. A particular mobile device 106 may be detected at multiple locations corresponding to different merchants over a time period. A member is identified by correlating or matching a mobile device identifier linked to the location information received from the mobile device 106 to mobile device identifiers in member profiles. That is, a mobile device 106 is identified by a mobile device identifier defined in a member profile, and in turn, a member is identified by member identification in the member profile with the same mobile device identifier. A mobile device 106 may be linked to a member such that the mobile device identifier may identify a single member profile and in turn a single member. A member may be linked to multiple mobile devices 106 in some example embodiments. The mobile device utility 112*a*/112*b* may transmit a greeting to mobile device 106 to welcome the member to the merchant location, in some examples. An example welcome interface 150 with a greeting message is shown in FIG. 13.

At 208, loyalty system 114 via mobile device utility 112*a*/112*b* transmits a reward to mobile device 106. The mobile device utility 112*a*/112*b* may transmit the reward to the mobile device 106 at approximately a time when the mobile device 106 is within the predefined distance of the location identified in a merchant profile. That is, detection of a mobile device 106 at a merchant location triggers transmission of a reward to the mobile device 106. The reward relates to or identifies a merchant identified by merchant identification in the merchant profile identifying the location. That is, the reward is for redemption at the merchant's location. The reward may also be referred to herein as an offer. The reward comprises a machine readable code and may be stored at the mobile device as a reward token 526. The reward triggers contributions to the supported organizations based on a transaction between the member and the merchant. The reward may be associated with one or more goods or services offered for purchase by the merchant. An example reward interface 152 with details of the reward and the contribution triggered by the reward redemption is shown in FIG. 13.

At 210, loyalty system 114 detects a transaction between member and merchant, where the transaction involves payment using mobile device 104. As described, mobile device 104 may include a financial card token 510 for payment for transactions with merchant system 104. The mobile device 104 may exchange data directly with merchant system 104 to process payment for the transaction (see e.g. FIG. 15) or may interact with mobile device utility 112*a*/112*b* for payment processing. An example payment interface 154 with details of the payment confirmation is shown in FIG. 13.

At 212, loyalty system 114 detects reward redemption for the transaction. The loyalty system 114 receives transaction data for a transaction between the member and the merchant processed using mobile device 104 at a point of sale facility at the merchant's location. The transaction data indicates member identification, merchant identification, a transaction amount, a date, a time, an indication that payment for the transaction involved the mobile device 106, and an indication of the reward. The loyalty system 114 processes the transaction data to detect the reward redemption. The loyalty system 114 may record details regarding reward redemption in member profile (linked to member identification) and merchant profile (linked to merchant identification) using the transaction data. Redemption of the reward may be initiated by mobile device 106 via the machine readable code.

At 214, loyalty system 114 triggers a contribution to one or more supported organizations based on transaction. Further details regarding contributions to supported organizations are described herein. That is, loyalty system 114 generates signals for directing a contribution amount for a contribution to the one or more supported organizations based on the reward redemption. Details regarding rules for contributions are described herein. For example, the contribution amount may be linked to the transaction amount for example.

At 216, loyalty system 114 triggers transmission of a notification to mobile device 106 via mobile device utility 112*a*/112*b* regarding the contribution. An example notification is shown in FIG. 13 as a contribution interface 156 of a mobile device 106. The transmission of the notification may be triggered at a time approximate the transaction. The notification may indicate an amount for the contribution and the supported organization.

At 218, loyalty system 114 generates reports for merchant system 104 based on transactions, reward redemption, mobile usage, contributions, and other analytics. Further details on analytics and reports are described herein.

The mobile device utility may also enable a member to disseminate information related to the social networking aspect of the present invention, as described more fully below.

Social Networking

Social networking sites typically focus on building online communities of people sharing interests and activities, or who are interested in exploring the interests and activities of others. The present invention provides a means by which to expand the reach of ACM program administrator's and merchants' marketing to members' social networking contacts. Contributions can be correspondingly increased.

Figure 8:
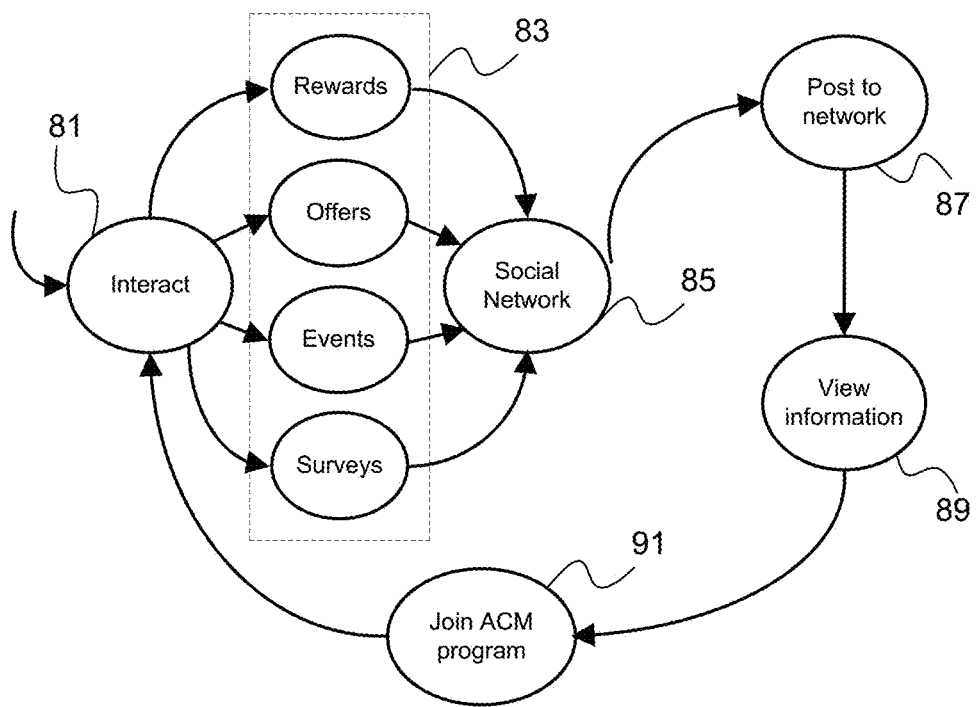
FIG. 8 illustrates the present invention whereby a member facilitates dissemination of aspects of an ACM program using an electronic social network.

FIG. 8 illustrates the present invention whereby a member facilitates dissemination of aspects of an ACM program using an electronic social network. The member interact with the ACM program and/or merchant 81, may upload and disseminate ACM program information 83 to their social network 85 including rewards, offers, events, and surveys associated with the ACM program. The ACM program information 83 may then be posted to the social networks 87 or directed to targeted contacts within those networks. This may enable others in the social network to view 89 the ACM program information to identify purposes that are in line with their own interests and for these others to join 91 the ACM program or take advantage of the rewards, offers, and surveys in accordance with the rules of the ACM program.

Figure 9:
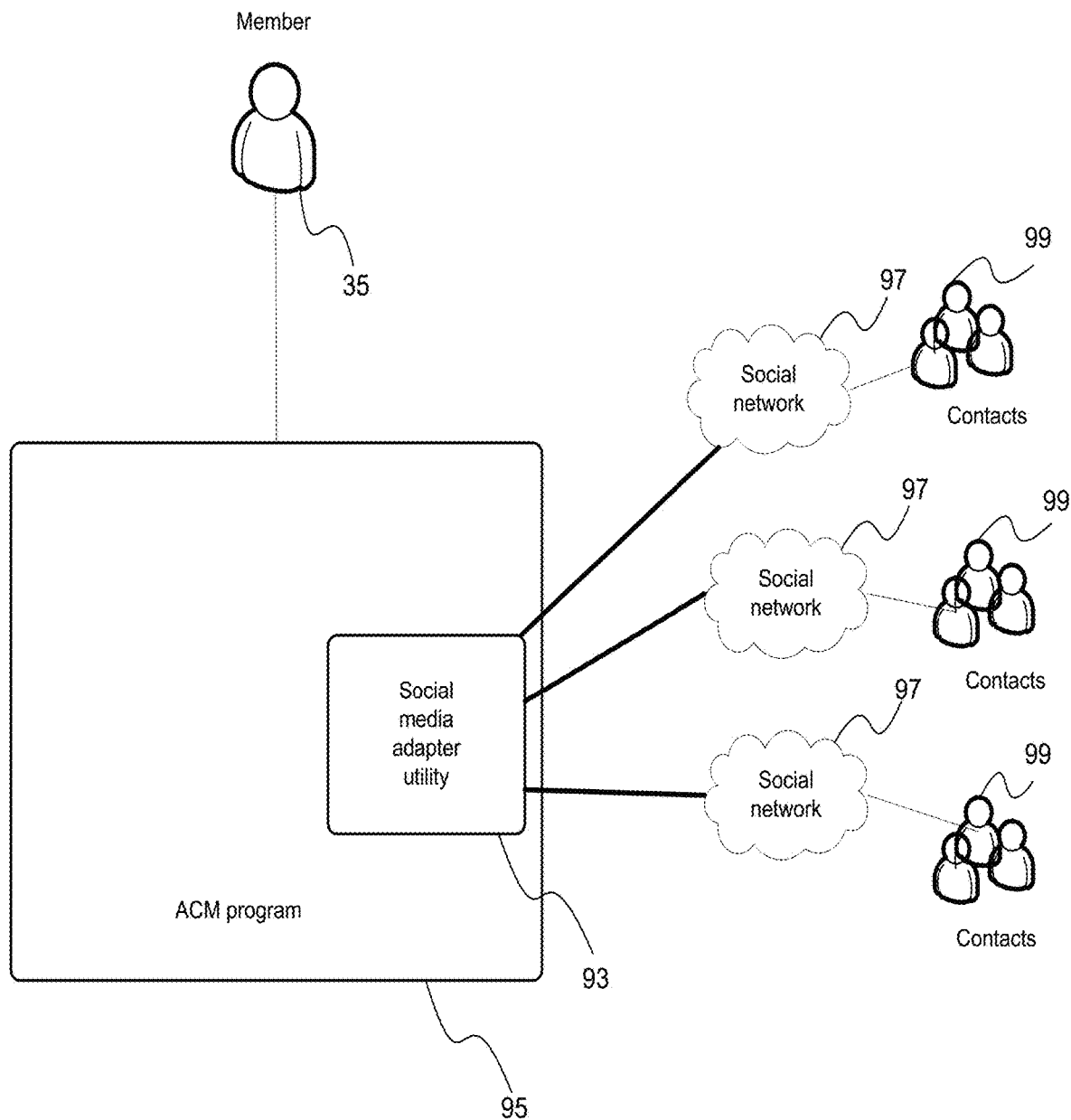
FIG. 9 illustrates the architecture of a social media adapter utility for an ACM program in accordance with the present invention.

FIG. 9 illustrates the architecture of a social media adapter utility for an ACM program in accordance with the present invention. The social media adapter utility 93 is operable for any ACM program 95 and, in particular, should not be considered limited to an ACM program where merchants and supported organizations are of any particular type, whether local, regional, national, etc.

The system of the present invention may provide a means by which to associate an ACM program with one or more social networks 97 further linked to one or more contacts 99. Each member may be provided with a facility to connect aspects of their ACM program profile with one or more electronic social networks of their choice. For example, the system of the present invention may include a web page on which the member provides its social network information, including authentication information, to the ACM program. The ACM program may use this information to create links between the ACM program and the one or more social networks indicated by the member.

A member may link a social network profile with the ACM program using a social media adapter utility 93. The social media adapter utility 93 may be accessed by a web page associated with the ACM program. The member may authenticate to the ACM program using the web page and may be provided with a social media adapter utility web page.

The social media adapter utility web page may display a list of social networks linked by the member. The member may update, delete and insert external social network links. To create a link, the member may submit the name of the social network, which may result in the social media adapter utility enabling an API for that social network. The member may also enter its social network authentication information. Thereafter, the social media adapter utility may be linked with the social network for the member. To update a link, the member may select the name of the social network from the list. The member may alter the social network name or authentication information for that social network, and submit the changes to the social media adapter utility. To delete a link, the member may delete the name of the social network from the list.

Alternatively, the member may not provide its social network password to the social media adapter utility, but may be required to enter the password each time the social network features of the ACM program are engaged.

The social network features may also include uploading rewards to the social network. For example, a member may have browsed or searched for rewards using the ACM program portal or the mobile device utility. The member may select a social network button corresponding to a displayed reward. The social media adapter utility may determine whether the member has provided the necessary information to enable a link to that social network and, if so, the social media adapter utility may post a message on the member's social network web page advertising the reward. Alternatively, if the information is not present, the social media adapter utility may request the information from the member and then disseminate the information. Optionally, the member may be required to confirm the posting when they next log in manually to the social network, as might be dictated by rules of the social network.

Similar techniques may be used to disseminate surveys, events, and contests to the social networks. A member may also disseminate information regarding its contribution statistics. The member may access this information using analytics provided by the ACM program. Using a similar method to that outlined above, the member may disseminate the contribution statistics using social networks. Similarly, the member could disseminate any other information provided by the ACM program.

This may provide an advantageous means for the ACM program, and merchants and sponsors associated therewith, to become known to the general public.

EXAMPLE IMPLEMENTATION

The systems described above may be implemented fully in software except for a transceiver means to communicate with members' mobile communication devices. The use and implementation of said transceiver means is well known to those skilled in the art.

Each of the intermediary enabled sales, enhanced analytics, mobile communication facility, and social networking may be provided using software layers running over ACM program software.

For example, the intermediary enabled sales facility may be associated with the ACM program software in such a way to exchange information regarding merchants' rewards, offers, and surveys with members' preferences, locations, and mobile device settings. Thus the ACM program may be used as a facility to enable the intermediary enabled sales facility to function appropriately. The intermediary enabled sales functionality enables the enhanced analytics.

The mobile communication facility, similarly, may be associated with the ACM program such that a member may indicate in their ACM program profile that they wish to receive rewards, offers, and surveys on their mobile device. The member may also input their mobile device settings (such as phone number) to the ACM program. The mobile communication facility may query these settings to determine how and where to send rewards, offers, and surveys. The mobile communication facility may then direct information to mobile devices by interfacing with a transceiver means and using protocols including SMS, MMS, 3G, Edge, 1x, EVDO, Wi-fi, or Bluetooth. Other protocols may also be used.

The social networking aspect may also be associated with the ACM program to associate a member with rewards, offers, and surveys. Thus the member can access the above mentioned functions of the social networking aspect using an interface provided by the ACM program. The social networking aspect may also have links to one or more social networks to effect dissemination in accordance with the member's directions.

Finally, each of the intermediary enabled sales facility, mobile device communication facility, and social networking aspect may be associated with the ACM program in such a way that they may interface with each other. For example, as described above, the use of a survey using the mobile device communication facility may correspond to flow through in accordance with the advertising enabled sales facility. Such a function may be enabled by the ACM program's association to each of the two facilities.

The invention claimed is:
1. An Internet server hardware system comprising:
a loyalty engine comprising a data storage device and a processor for configuring a loyalty program, wherein:
  the loyalty program generates one or more member profiles and one or more merchant profiles;
  each of the one or more member profiles defines demographic data, financial card data, supported organization data, a member identification, and mobile device information;
  each merchant profile defines a merchant identification and a location;
  the loyalty engine creates rewards for members of the loyalty program using the demographic data, the supported organization data, and the locations associated with the merchants; and
  each said reward is defined by a rule for a contribution to a supported organization in the supported organizations data based on transaction data for transactions between said members and said merchants;
a mobile device utility providing an interface between the loyalty engine and one or more mobile devices, wherein the mobile device utility is configured to:
  interface with location tracking hardware of a mobile device of the one or more mobile devices to determine that the mobile device location is within a predefined distance of a location identified in a merchant profile of the one or more merchant profiles, wherein:
    the mobile device is identified by mobile device information defined in a member profile of the one or more member profiles;
    and
    a member is identified by member identification in the member profile;
  trigger transmission of a reward of the rewards of the loyalty program to the mobile device upon a determination that the mobile device is within the predefined distance of the location identified in a merchant profile;
wherein:
  the reward relates to a merchant identified by merchant identification in the merchant profile identifying the location;
  the reward triggers contributions to the one or more supported organizations based on a transaction between the member and the merchant;
  and
  the loyalty engine:
    receives transaction data for a transaction between the member and the merchant, wherein:
      data signals for the transaction data are exchanged via near field communication (NFC) devices for the transaction between the member and the merchant:
      the transaction is processed at a point of sale facility at the location identified in corresponding said merchant profile;
      the received transaction data for the transaction between the member and the merchant includes an indicator that the transaction between the member and the merchant has been authorized; and the transaction data indicates an indication of the reward;

determines, using the indication of the reward in the transaction data, that the transaction involved redemption of the reward; and for each said redemption of the reward:

determines a contribution amount to a corresponding said supported organization based on the corresponding said rule; and generates signals for directing the contribution amount to the corresponding said supported organization.

2. The Internet server hardware system of claim 1, further comprising an application for a mobile device interfacing with the mobile device utility for performing a function selected from the group consisting of:

receiving the reward and notification of the contribution;

transmitting location information from a location tracking device receiving reports relating to reward redemption and contributions to supported organizations; and managing reward tokens and financial card tokens stored on a data storage device of the mobile device.

3. The Internet server hardware system of claim 1, wherein the reward comprises a machine readable code.

4. The Internet server hardware system of claim 3, wherein the determination that the transaction involved redemption of the reward is initiated via the machine readable code.

5. The Internet server hardware system of claim 1, wherein, for each said redemption of the reward, the loyalty engine provides to the merchant, an analytic data report relating to the transaction to increase the number of revenue from future said transactions, wherein the analytic data report comprises data relating to reward redemption, reward management, future said transactions, member preferences, member responses to the rewards, and the contributions made to supported organizations.

6. The Internet server hardware system of claim 1, wherein the loyalty engine records information exchanged using the mobile device utility to provide real-time or near real-time synchronization between the mobile device utility and the loyalty engine.

7. The Internet server hardware system of claim 1, wherein the loyalty engine generates a mobile specific report comprising data regarding locations of the mobile device and transactions using the mobile device.

8. The Internet server hardware system of claim 1, wherein the mobile device utility authenticates the mobile device prior to transmitting the reward.

9. The Internet server hardware system of claim 1, wherein the mobile device utility authenticates the financial card data of the member profile prior to enabling the mobile device to store a financial card token for processing the payment for the transaction.

10. The Internet server hardware system of claim 1, wherein:

prior to transmitting the reward, the mobile device utility receives a preferred list of merchants;

the preferred list of merchants:

is associated with a member profile of the one or more member profiles; and identifies a merchant identification of a merchant profile of the one or more merchant profiles; and the mobile device utility determines that the merchant profile identifying the location corresponds to the merchant profile identified by the preferred list of merchants.

11. The Internet server hardware system of claim 1, wherein the mobile device utility transmits a feedback request to the mobile device after the transaction.

12. The Internet server hardware system of claim 1, wherein the loyalty engine is configured to generate signals for posting on at least one social network information regarding the member, the merchant, the redemption of the reward, and the contribution.

13. A method comprising a plurality of steps each being performed by hardware executing software, wherein the steps include:

configuring a loyalty program for members having mobile devices, using a loyalty engine, wherein:

the loyalty program generates one or more member profiles and one or more merchant profiles;

each of the one or more member profiles defines demographic data, financial card data, supported organization data, a member identification, and mobile device information;

each merchant profile defines a merchant identification and a location;

the loyalty engine creates rewards for members of the loyalty program using the demographic data, the supported organization data, and the locations associated with the merchants; and each said reward is defined by a rule for a contribution to a supported organization in the supported organizations data based on transaction data for transactions between said members and said merchants;

configuring a mobile device utility to interface between the loyalty engine and one or more mobile devices;

detecting, using the mobile device utility interfacing with location tracking hardware of a mobile device of the one or more mobile devices, that the mobile device location is within a predefined distance of a location identified in a merchant profile of the one or more merchant profiles, wherein:

the mobile device is identified by mobile device information defined in a member profile of the one or more member profiles; and a member is identified by member identification in the member profile;

transmitting a reward of the rewards of the loyalty program to the mobile device when the mobile device is detected within the predefined distance of the location identified in a merchant profile, wherein:

the reward relates to a merchant identified by merchant identification in the merchant profile identifying the location; and the reward triggers contributions to the one or more supported organizations based on a transaction between the member and the merchant;

receiving transaction data for a transaction between the member and the merchant, wherein:

the transaction is processed at a point of sale facility at the location identified in corresponding said merchant profile;

data signals for the transaction data are exchanged via near field communication (NFC) devices for the transaction between the member and the merchant;

the received transaction data for the transaction between the member and the merchant includes an indicator that the transaction between the member and the merchant has been authorized; and the transaction data indicates an indication of the reward;

detecting, using the indication of the reward in the transaction data, that the transaction involved redemption of the reward; and for each said redemption of the reward:

determining a contribution amount to a corresponding said supported organization based on the corresponding said rule;

providing to the merchant, an analytic data report relating to the transaction to increase the number of revenue from future said transactions, wherein the analytic data report comprises data relating to reward redemption, reward management, future said transactions, member preferences, member responses to the rewards, and the contributions made to supported organizations;

generating signals for directing the contribution amount to the corresponding said supported organization; and transmitting notification, using the mobile device utility, to the mobile device after the transaction, the notification indicating the contribution.

14. The method as defined in claim 13, wherein the steps further comprise generating reports relating to reward redemption and contributions to supported organizations and transmitting the reports, using the mobile device utility, to the mobile device or the merchant.

15. The method as defined in claim 13, wherein the steps further comprise recording information exchanged using the mobile device utility to provide real-time or near real-time synchronization between the mobile device utility and the loyalty engine.

16. The method as defined in claim 13, further comprising an application for a mobile device interfacing with the mobile device utility for performing a function selected from the group consisting of:

receiving the reward and notification of the contribution;
transmitting location information from a location tracking device
receiving reports relating to reward redemption and contributions to supported organizations; and
managing reward tokens and financial card tokens stored on a data storage device of the mobile device.

17. The method as defined in claim 13, wherein the reward comprises a machine readable code.

18. The method as defined in claim 17, wherein the determination that the transaction involved redemption of the reward is initiated via the machine readable code.

19. The method as defined in claim 13, wherein, for each said redemption of the reward, the loyalty engine provides to the merchant, an analytic data report relating to the transaction to increase the number of revenue from future said transactions, wherein the analytic data report comprises data relating to reward redemption, reward management, future said transactions, member preferences, member responses to the rewards, and the contributions made to supported organizations.

20. A non-transitory computer-readable medium or media storing computer instructions which when executed by at least one computer processor causes the at least one computer processor to perform acts comprising:

configuring the loyalty program for members having mobile devices, using a loyalty engine, wherein:

the loyalty program generates one or more member profiles and one or more merchant profiles;

each of the one or more member profiles defines demographic data, financial card data, supported organization data, a member identification, and mobile device information;

each merchant profile defines a merchant identification and a location;

the loyalty engine creates rewards for members of the loyalty program using the demographic data, the supported organization data, and the locations associated with the merchants; and each said reward is defined by a rule for a contribution to a supported organization in the supported organizations data based on transaction data for transactions between said members and said merchants;

configuring a mobile device utility to interface between the loyalty engine and one or more mobile devices;

detecting, using the mobile device utility interfacing with location tracking hardware of a mobile device of the one or more mobile devices, that the mobile device location is within a predefined distance of a location identified in a merchant profile of the one or more merchant profiles, wherein:

the mobile device is identified by mobile device information defined in a member profile of the one or more member profiles; and a member is identified by member identification in the member profile;

transmitting a reward of the rewards of the loyalty program to the mobile device when the mobile device is detected within the predefined distance of the location identified in a merchant profile, wherein:

the reward relates to a merchant identified by merchant identification in the merchant profile identifying the location; and the reward triggers contributions to the one or more supported organizations based on a transaction between the member and the merchant;

receiving transaction data for a transaction between the member and the merchant, wherein:

the transaction is processed at a point of sale facility at the location identified in corresponding said merchant profile;

data signals for the transaction data are exchanged via near field communication (NFC) devices for the transaction between the member and the merchant;

the received transaction data for the transaction between the member and the merchant includes an indicator that the transaction between the member and the merchant has been authorized; and the transaction data indicates an indication of the reward;

detecting, using the indication of the reward in the transaction data, that the transaction involved redemption of the reward;

and for each said redemption of the reward:

determining a contribution amount to a corresponding said supported organization based on the corresponding said rule;

providing to the merchant, an analytic data report relating to the transaction to increase the number of revenue from future said transactions, wherein the analytic data report comprises data relating to reward redemption, reward management, future said transactions, member preferences, member responses to the rewards, and the contributions made to supported organizations;

generating signals for directing the contribution amount to the corresponding said supported organization;

and transmitting notification, using the mobile device utility, to the mobile device after the transaction, the notification indicating the contribution.

\* \* \* \* \*